United States Patent
Matsumura et al.

(10) Patent No.: US 12,167,432 B2
(45) Date of Patent: Dec. 10, 2024

(54) TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 389 days.

(21) Appl. No.: 17/756,597

(22) PCT Filed: Nov. 28, 2019

(86) PCT No.: PCT/JP2019/046655
§ 371 (c)(1),
(2) Date: May 27, 2022

(87) PCT Pub. No.: WO2021/106167
PCT Pub. Date: Jun. 3, 2021

(65) Prior Publication Data
US 2023/0007667 A1    Jan. 5, 2023

(51) Int. Cl.
*H04W 72/54* (2023.01)
*H04W 72/1273* (2023.01)
*H04W 72/23* (2023.01)

(52) U.S. Cl.
CPC ....... *H04W 72/54* (2023.01); *H04W 72/1273* (2013.01); *H04W 72/23* (2023.01)

(58) Field of Classification Search
CPC .............................. H04W 72/54; H04W 72/23
USPC ........................................................ 370/329
See application file for complete search history.

(56) References Cited

U.S. PATENT DOCUMENTS

2019/0229792 A1*  7/2019  John Wilson ......... H04L 5/0051

OTHER PUBLICATIONS

3GPP TSG RAN WG1 Meeting #99; R1-1913390 "FL summary 2 on A-CSI-RS triggering with different numerology between CSI-RS and triggering PDCCH" Nokia, Nokia Shanghai Bell; Reno, NV, USA; Nov. 18-22, 2019 (8 pages).
3GPP TSG RAN WG1 #99; R1-1912861 "Enhancements on multi-TRP and multi-panel transmission" ITRI; Reno, JSA; Nov. 18-22, 2019 (5 pages).

(Continued)

*Primary Examiner* — Sibte H Bukhari
(74) *Attorney, Agent, or Firm* — Osha Bergman Watanabe & Burton LLP

(57) ABSTRACT

A terminal according to one aspect of the present disclosure includes: a control section that derives a Quasi-Co-Location (QCL) assumption of an Aperiodic Channel State Information-Reference Signal (A-CSI-RS) based on a specific Transmission Configuration Indication state (TCI state) for a Physical Downlink Shared Channel (PDSCH) in a case where both of following conditions (1) and (2) are satisfied, where (1) a scheduling offset between reception of a downlink control channel for conveying downlink control information for scheduling the A-CSI-RS, and reception of the A-CSI-RS is less than a reported value of a duration for beam switch, and (2) there is not another downlink signal that includes an instructed TCI state or there is another downlink signal that does not include the instructed TCI state in a same symbol as a symbol of the A-CSI-RS; and a receiving section that receives the A-CSI-RS based on the QCL assumption.

5 Claims, 8 Drawing Sheets

(56) References Cited

OTHER PUBLICATIONS

3GPP TSG RAN WG1 Meeting RAN1 #99; R1-1912102 "On aperiodic CSI-RS triggering with different numerology between CSI-RS and triggering PDCCH" MediaTek Inc.; Reno, U.S.A.; Nov. 18-22, 2019 (4 pages).
3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).
International Search Report issued in International Application No. PCT/JP2019/046655, mailed Jul. 14, 2020 (7 pages).
Written Opinion issued in International Application No. PCT/JP2019/046655; Dated Jul. 14, 2020 (4 pages).
Office Action issued in Chinese Application No. 201980103513.6; Dated Sep. 28, 2023 (12 pages).
Office Action in the counterpart Chinese Application No. 201980103513.6, mailed Apr. 27, 2023 (15 pages).
Ericsson:"Summary of draft CRs for beam management and QCL", 3GPP TSG-RAN WG1 Meeting #96, Tdoc R1-1903382; Athens, Feb. 25-Mar. 1, 2019 (23 pages).
Extended European Search Report issued in European Application No. 19954350.5, mailed on Jun. 29, 2023 (10 pages).

\* cited by examiner

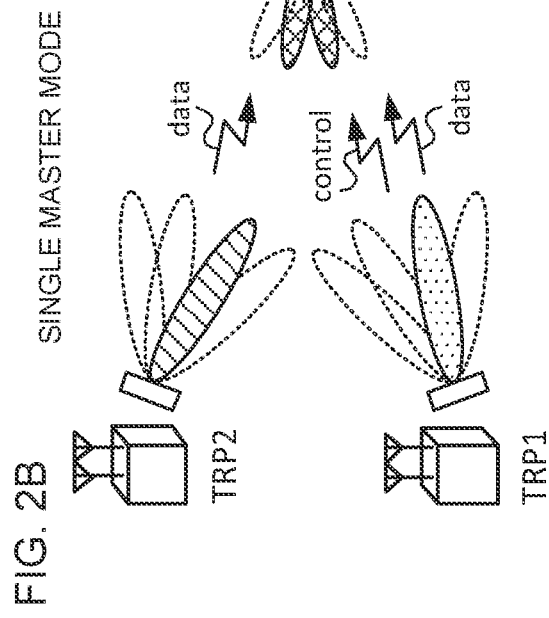
FIG. 2A SINGLE MODE
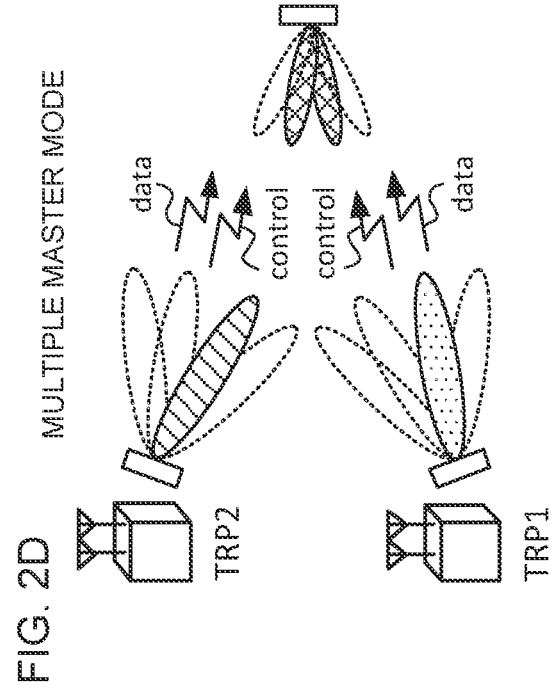
FIG. 2B SINGLE MASTER MODE
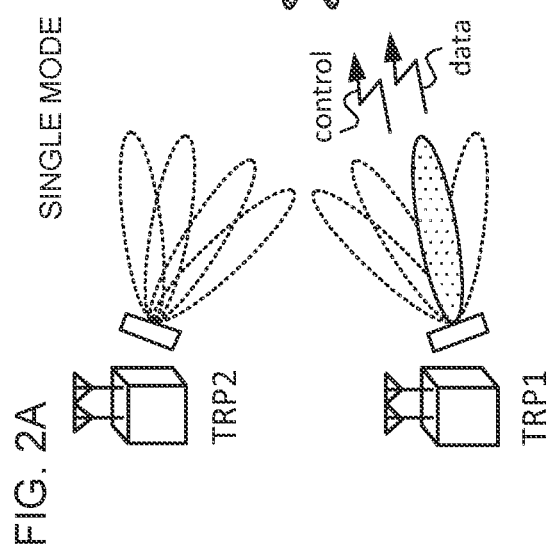
FIG. 2C MASTER SLAVE MODE
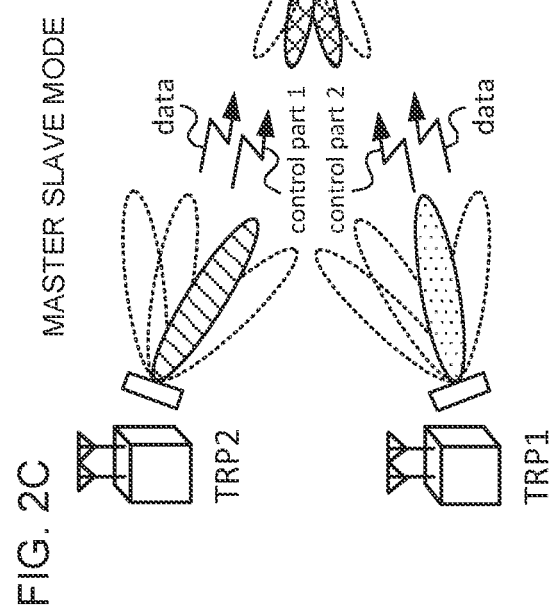
FIG. 2D MULTIPLE MASTER MODE

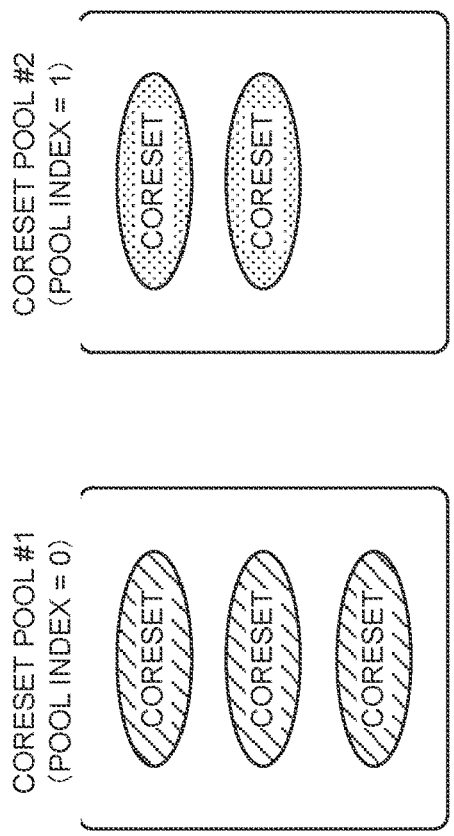
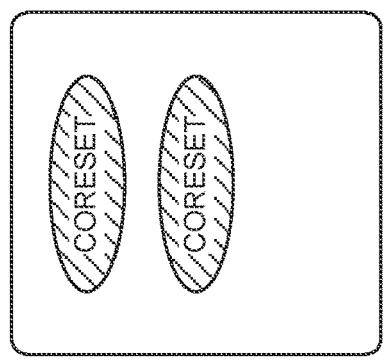
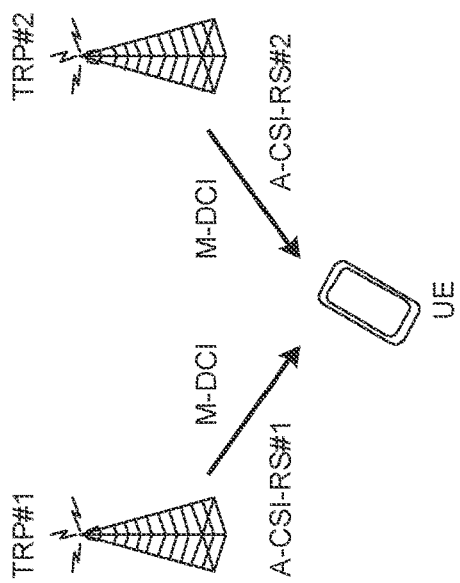
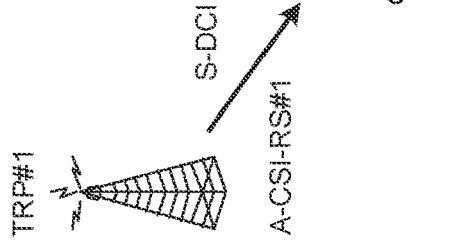
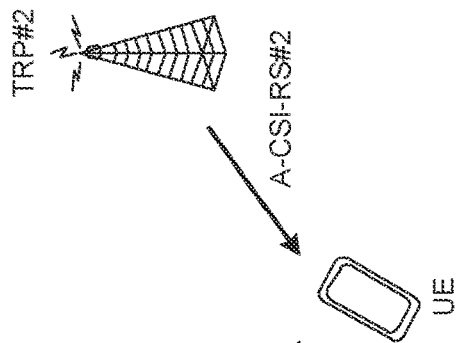
FIG. 3A
FIG. 3B

FIG. 4A
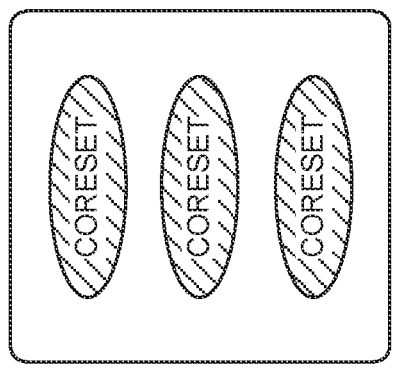
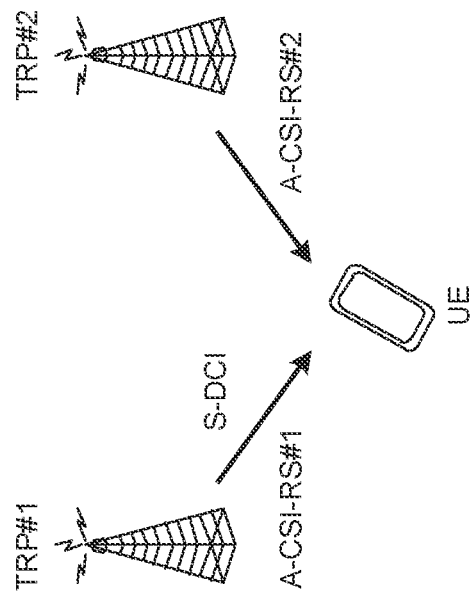
FIG. 4B
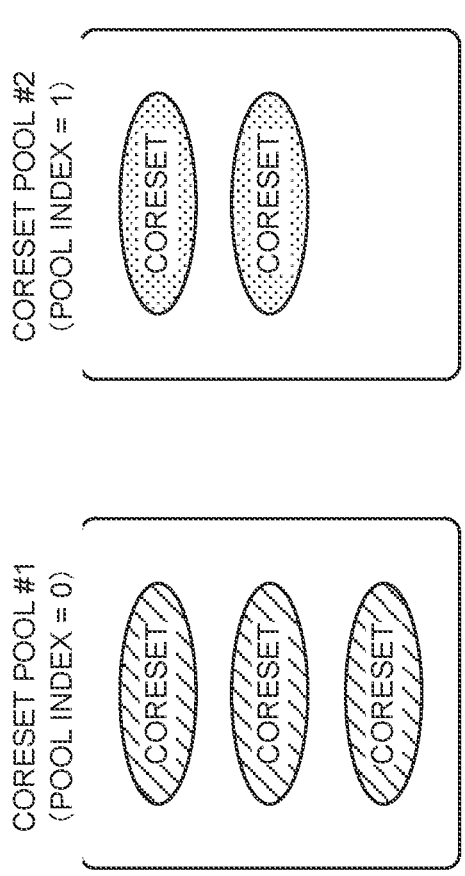
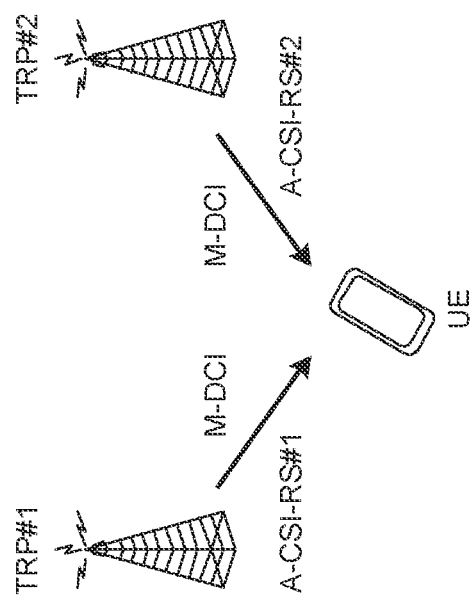

TERMINAL AND RADIO COMMUNICATION METHOD

TECHNICAL FIELD

The present disclosure relates to a terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of a larger capacity and higher sophistication than those of LTE (Third Generation Partnership Project (3GPP) Releases (Rel.) 8 and 9), LTE-Advanced (3GPP Rel. 10 to 14) has been specified.

LTE successor systems (also referred to as, for example, the 5th generation mobile communication system (5G), 5G+ (plus), New Radio (NR) or 3GPP Rel. 15 or subsequent releases) are also studied.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

According to a future radio communication system (e.g., NR), a user terminal (UE: User Equipment) measures a channel state based on a Channel State Information Reference Signal (CSI-RS), and feeds back (reports) Channel State Information (CSI) to a network (e.g., base station).

An Aperiodic CSI (A-CSI) reporting is studied as a CSI feedback method. A CSI-RS measured for the A-CSI reporting may be referred to as an Aperiodic CSI-RS (A-CSI-RS).

It is studied for NR to determine a Quasi-Co-Location (QCL) assumption for reception of the A-CSI-RS based on a beam switch timing reported by the UE.

Furthermore, it is studied for NR that one or a plurality of Transmission/Reception Points (TRPs) (multi TRPs) perform DL transmission for the UE by using one or a plurality of panels (multiple panels).

However, past arguments on NR have not yet studied default QCL of the A-CSI-RS in a case of multi TRPs. Hence, there is a case where conforming to a current NR specification makes it impossible to appropriately determine a QCL assumption of the A-CSI-RS and measure CSI, and there is a risk that an increase in a communication throughput is suppressed.

It is therefore one of objects of the present disclosure to provide a terminal and a radio communication method that can appropriately determine a QCL assumption of an A-CSI-RS.

Solution to Problem

A terminal according to one aspect of the present disclosure includes: a control section that derives a Quasi-Co-Location (QCL) assumption of an Aperiodic Channel State Information-Reference Signal (A-CSI-RS) based on a specific Transmission Configuration Indication state (TCI state) for a Physical Downlink Shared Channel (PDSCH) in a case where both of following conditions (1) and (2) are satisfied, where (1) a scheduling offset between reception of a downlink control channel for conveying downlink control information for scheduling the A-CSI-RS, and reception of the A-CSI-RS is less than a reported value of a duration for beam switch, and (2) there is not another downlink signal that includes an instructed Transmission Configuration Indication state (TCI state) or there is another downlink signal that does not include the instructed TCI state in a same symbol as a symbol of the A-CSI-RS; and a receiving section that receives the A-CSI-RS based on the QCL assumption.

Advantageous Effects of Invention

According to one aspect of the present disclosure, it is possible to appropriately determine a QCL assumption of an A-CSI-RS.

BRIEF DESCRIPTION OF DRAWINGS

FIGS. 2A to 2D are diagrams illustrating one example of a multi TRP scenario.

FIGS. 3A and 3B are diagrams illustrating one example of a CORESET configured in a first embodiment.

FIGS. 4A and 4B are diagrams illustrating one example of a CORESET configured in a second embodiment.

Figure 1:
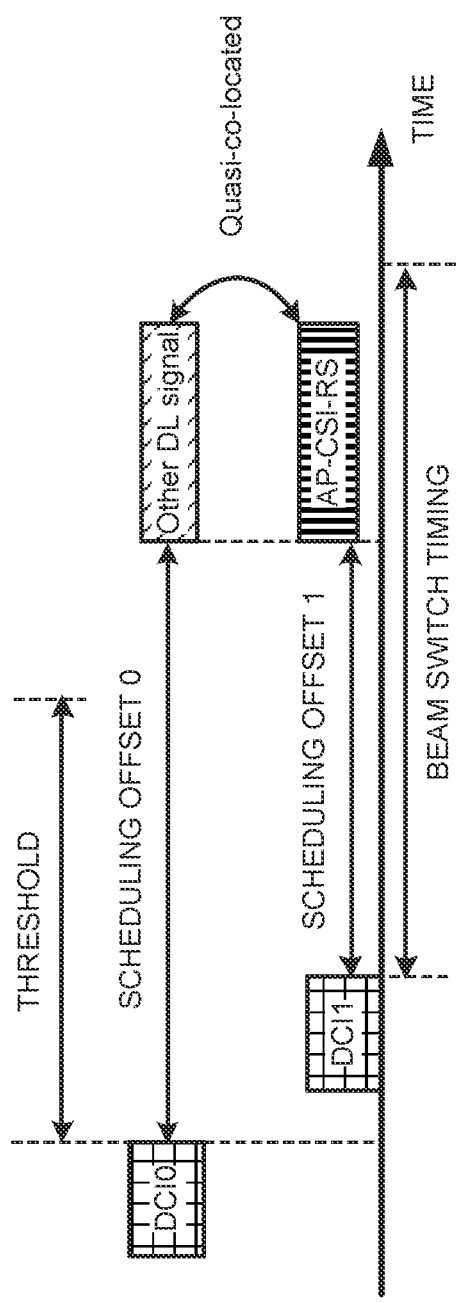
FIG. 1 is a diagram illustrating one example of a QCL assumption of an A-CSI-RS.

DESCRIPTION OF EMBODIMENTS (TCI, QCL and Spatial Relation)

It is studied for NR to control UE's reception processing (e.g., at least one of reception, demapping, demodulation and decoding) and transmission processing (e.g., at least one of transmission, mapping, precoding, modulation and encoding) of at least one of a signal and a channel (that are expressed as a signal/channel) based on a Transmission Configuration Indication state (TCI state).

The TCI state may indicate an element that is applicable to a downlink signal/channel. An element corresponding to a TCI state applied to an uplink signal/channel may be expressed as a spatial relation.

The TCI state is information related to Quasi-Co-Location (QCL) of a signal/channel, and may be referred to as, for example, a spatial reception parameter or Spatial Relation Information (SRI). The TCI state may be configured to the UE per channel or per signal.

QCL is an index that indicates a statistical property of a signal/channel. In a case where, for example, a certain signal/channel and another signal/channel have a QCL relation, the QCL relation may mean that it is possible to assume that at least one of a Doppler shift, a Doppler spread, an average delay, a delay spread and a spatial parameter (e.g., spatial reception parameter (spatial Rx parameter)) is identical (at least one of these parameters is quasi-co-located) between a plurality of these different signals/channels.

In addition, the spatial reception parameter may be associated with a UE reception beam (e.g., reception analog beam), and the beam may be specified based on spatial QCL. The QCL (or at least one element of the QCL) in the present disclosure may be read as spatial QCL (sQCL).

A plurality of types of QCL (QCL types) may be specified. For example, four QCL types A to D whose parameters (or parameter sets) that can be assumed as identical (QCL) are different may be provided, and the parameters (that may be referred to as QCL parameters) are as follows:

QCL type A (QCL-A): Doppler shift, Doppler spread, average delay and delay spread,
QCL type B (QCL-B): Doppler shift and Doppler spread,
QCL type C (QCL-C): Doppler shift and average delay, and
QCL type D (QCL-D): spatial reception parameter.

A UE's assumption that a certain Control Resource Set (CORESET), channel or reference signal has a specific QCL (e.g., QCL type D) relation with another CORESET, channel or reference signal may be referred to as a QCL assumption.

The UE may determine at least one of a transmission beam (Tx beam) and a reception beam (Rx beam) of the signal/channel based on a TCI state or the QCL assumption of the signal/channel.

The TCI state may be, for example, information related to QCL of a target channel (in other words, a Reference Signal (RS) for the target channel) and another signal (e.g., another RS). The TCI state may be configured (instructed) by a higher layer signaling, a physical layer signaling or a combination of these signalings.

In the present disclosure, the higher layer signaling may be one or a combination of, for example, a Radio Resource Control (RRC) signaling, a Medium Access Control (MAC) signaling and broadcast information.

For example, an MAC Control Element (MAC CE) or an MAC Protocol Data Unit (PDU) may be used for the MAC signaling. The broadcast information may be, for example, a Master Information Block (MIB), a System Information Block (SIB), Remaining Minimum System Information (RMSI) or Other System information (OSI).

The physical layer signaling may be, for example, Downlink Control Information (DCI).

A channel to which the TCI state or the spatial relation is configured (indicated) may be at least one of, for example, a Physical Downlink Shared Channel (PDSCH), a Physical Downlink Control Channel (PDCCH), a Physical Uplink Shared Channel (PUSCH) and a Physical Uplink Control Channel (PUCCH).

Furthermore, an RS that has the QCL relation with the channel may be at least one of, for example, a Synchronization Signal Block (SSB), a Channel State Information Reference Signal (CSI-RS), a Sounding Reference Signal (SRS), a tracking CSI-RS (also referred to as a Tracking Reference Signal (TRS)), and a QCL detection reference signal (also referred to as a QRS).

The SSB is a signal block including at least one of a Primary Synchronization Signal (PSS), a Secondary Synchronization Signal (SSS) and a Physical Broadcast Channel (PBCH). The SSB may be referred to as an SS/PBCH block.

The UE may receive configuration information (e.g., PDSCH-Config or tci-StatesToAddModList) including a list of information elements of TCI states by a higher layer signaling.

An information element of a TCI state ("TCI-state IE" of RRC) configured by the higher layer signaling may include a TCI state ID and one or a plurality of pieces of QCL information ("QCL-Info"). The QCL information may include at least one of information (RS related information) that relates to an RS that is in a QCL relation, and information (QCL type information) that indicates a QCL type. The RS related information may include information such as an RS index (e.g., an SSB index or a Non-Zero-Power CSI-RS (NZP CSI-RS) resource Identifier (ID)), an index of a cell in which the RS is arranged, and an index of a Bandwidth Part (BWP) in which the RS is arranged.

According to Rel. 15 NR, both of an RS of the QCL type A and an RS of the QCL type D or only the RS of the QCL type A may be configured as a TCI state of at least one of a PDCCH and a PDSCH to the UE.

<TCI State for PDCCH>

Information related to QCL of a PDCCH (or a DeModulation Reference Signal (DMRS) antenna port associated with the PDCCH) and a certain DL-RS may be referred to as, for example, a TCI state for the PDCCH.

The UE may decide the TCI state for a UE-specific PDCCH (CORESET) based on a higher layer signaling. For example, one or a plurality of (K) TCI states may be configured to the UE per CORESET by an RRC signaling.

The UE may activate one of a plurality of TCI states configured by the RRC signaling for each CORESET by using an MAC CE. The MAC CE may be referred to as a TCI State Indication for a UE-specific PDCCH MAC CE. The UE may monitor the CORESET based on an active TCI state associated with the CORESET.

<TCI State for PDSCH>

Information related to QCL of a PDSCH (or a DMRS antenna port associated with the PDSCH) and a given DL-RS may be referred to as, for example, a TCI for the PDSCH.

M (M≥1) TCI states for PDSCHs (QCL information for the M PDSCHs) may be notified (configured) to the UE by a higher layer signaling. In addition, the number M of TCI states configured to the UE may be limited according to at least one of UE capability and a QCL type.

DCI used to schedule a PDSCH may include a given field (that may be referred to as, for example, a TC field or a TCI state field) that indicates a TCI state for the PDSCH. The DCI may be used to schedule a PDSCH of one cell, and may be referred to as, for example, DL DCI, a DL assignment, a DCI format 1_0 and a DCI format 1_1.

Whether or not the TCI field is included in the DCI may be controlled based on information notified from a base station to the UE. The information may be information (e.g., TCI-PresentInDCI) that indicates whether the TCI field is present or absent in the DCI. The information may be referred to as TCI presence information, and may be configured to the UE by, for example, a higher layer signaling.

In a case where TCI states of more than 8 types are configured to the UE, the TCI states of 8 types or less may be activated (or indicated) by using an MAC CE. The MAC CE may be referred to as a TCI States Activation/Deactivation for a UE-specific PDSCH MAC CE. The value of the TCI field in the DCI may indicate one of the TC states activated by the MAC CE.

(Default QCL of A-CSI-RS of Rel. 15 NR)

According to NR, the UE measures a channel state by using a given reference signal (or a resource for the given reference signal), and feeds back (reports) Channel State Information (CSI) to the base station.

The UE may measure a channel state based on at least one of a CSI-RS, an SS/PBCH block and a DMRS as a reference signal.

As a CSI feedback method, a Periodic CSI (P-CSI) reporting, an Aperiodic CSI (A-CSI) reporting and a Semi-Permanent CSI (SP-CSI) reporting are studied.

The SP-CSI reporting (PUCCH-based SP-CSI reporting) that uses the PUCCH may be activated by an MAC CE. The SP-CSI reporting (PUSCH-based SP-CSI reporting) that uses the PUSCH and the A-CSI reporting that uses the PUSCH or the PUCCH may be activated (or triggered) by DCI.

For example, a CSI request field included in the DCI may indicate one trigger state from a plurality of trigger states configured by a higher layer signaling (e.g., RRC signaling). In addition, the CSI request field and a CSI trigger field may be interchangeably read.

A CSI-RS measured for the A-CSI reporting may be referred to as an Aperiodic CSI-RS (A-CSI-RS). The A-CSI reporting simultaneously triggers measurement of the A-CSI-RS and the A-CSI reporting by using DCI, so that it is possible to dynamically trigger a CSI reporting while efficiently using an RS resource and an uplink channel resource.

A list of trigger states for the A-CSI reporting may be configured by an RRC information element "CSI-AperiodicTriggerStateList". Each trigger state may be associated with, for example, one or a plurality of report configuration IDs (CSI-ReportConfigId), CSI resource configuration information or a TCI state (or QCL assumption) of an A-CSI-RS.

Regarding the A-CSI-RS resource of a CSI-RS resource set associated with a trigger state, a QCL configuration including an RS resource of QCL and a QCL type may be instructed to the UE by a higher layer. For example, the TCI state (or QCL assumption) of the A-CSI-RS may be indicated by (a CSI request field of) DCI for triggering measurement of the A-CSI RS.

By the way, a duration from DCI (triggering DCI) to an A-CSI-RS instructed (triggered) by the DCI may be specified in association with the above-described trigger state. For example, the UE determines a CSI-RS resource set ID associated with a measurement target CSI-RS resource set based on the trigger state. This CSI-RS resource set ID may be associated with an aperiodic triggering offset. The aperiodic triggering offset may be read as a scheduling offset.

The scheduling offset may mean an offset between a last symbol of a PDCCH for conveying DCI for triggering an A-CSI-RS resource set (or a last slot including the PDCCH), and a first symbol (or slot) of an A-CSI-RS resource of the resource set. As the scheduling offset of the A-CSI-RS, for example, a value equal to or more than 0 and equal to or less than 4 may be configured, or a value larger than 4 (e.g., 16 or 24) may be configured. A unit of the offset may be a symbol unit or may be a slot unit. Information of the scheduling offset of the A-CSI-RS may be associated with "aperiodicTriggeringOffset" of an RRC parameter.

In this regard, in the present disclosure, the scheduling offset may mean a duration from reception (e.g., last symbol) of given DCI (PDCCH) to start (e.g., first symbol) of a signal (e.g., A-CSI-RS) or a channel to be scheduled (or triggered) by the DCI. The scheduling offset may be read as, for example, a duration for scheduling or a duration from a PDCCH to a signal/channel to be scheduled.

Furthermore, it is studied to define UE capability related to a beam switching timing. The UE capability may be referred to, for example, as an A-CSI-RS beam switching timing or simply as a beam switching timing or a beam switch timing (RRC "beamSwitchTiming").

The beam switch timing may be defined as a minimum time (e.g., the number of OFDM symbols) between DCI for triggering an A-CSI-RS and transmission of the A-CSI-RS. The beam switch timing may indicate a time from a last symbol in which the above DCI is received to a first symbol of an A-CSI-RS to be triggered by the DCI. The beam switch timing may be based on, for example, delay related to decoding of a PDCCH and beam switching.

The beam switch timing may be applied to at least one of a first frequency range (Frequency Range 1 (FR 1)) and a second frequency range (Frequency Range 2 (FR 2)). For example, the FR 1 may be a frequency range equal to or less than 6 GHz (sub-6 GHz) or a frequency range equal to or less than 7125 MHz, and the FR 2 may be a frequency range higher than 24 GHz (above-24 GHz). In addition, the frequency ranges and definitions of the FR 1 and the FR 2 are not limited to these.

The beam switch timing may take a value that differs per subcarrier spacing (e.g., 60 kHz or 120 kHz).

The beam switch timing may take a value such as 14, 28, 48, 224 or 336 symbols. A relatively large value that is 336 symbols has been studied taking into account a time for switching a power supply of a panel that receives an A-CSI-RS from off to on in a case where multiple panels are mounted on the UE. This is because the UE may turn off the power supply of a panel of a beam that is not activated.

According to a specification of Rel. 15 NR, in a case where the scheduling offset of the A-CSI-RS is a beam switch timing or more reported by the UE, and in a case where a value of the reported beam switch timing is one of 14, 28 and 48, the UE is expected to apply the QCL assumptions in the indicated TCI states for the aperiodic CSI-RS resources in the CSI triggering state indicated by the CSI trigger (request) field in DCI. That is, in this case, the UE may receive the A-CSI-RS based on the TCI state indicated by the DCI.

Furthermore, in a case where the scheduling offset of the A-CSI-RS is less than the beam switch timing reported by the UE, in a case where the value of the reported beam switch timing is one of 14, 28 and 48, and in a case where there is another DL signal including the instructed TCI state in the same symbol as that of the A-CSI-RS, the UE may apply a QCL assumption of the another DL signal upon reception of the A-CSI-RS. Since a certain period of time is required to switch a reception beam of the UE associated with the TCI state indicated by the DCI after triggering DCI is demodulated, this specification intends to prevent a situation that switching cannot be performed in time until reception of the A-CSI-RS.

In addition, the another DL signal described herein may be at least one of a PDSCH that includes a scheduling offset equal or more than a given threshold (UE capability information ("timeDurationForQCL") (i.e., an offset from reception of DCI to start of reception of the PDSCH scheduled by the DCI is the given threshold or more), an A-CSI-RS (i.e., another A-CSI-RS) including a scheduling offset equal to or more than a beam switch timing of one of 14, 28 and 48 reported by the UE, a P-CSI-RS and an SP-CSI-RS.

timeDurationForQCL may be defined as a minimum time (e.g., the number of OFDM symbols) during which the UE receives a PDCCH and applies spatial QCL information of the PDCCH (DCI) for PDSCH processing. The beam switch timing may indicate a time from a last symbol in which the above DCI is received to a first symbol of the A-CSI-RS to be triggered by the DCI.

timeDurationForQCL may be referred to as, for example, a QCL time duration, "Threshold", "Threshold for offset between a DCI indicating a TCI state and a PDSCH scheduled by the DCI", "Threshold-Sched-Offset", a scheduling offset threshold or a scheduling offset threshold. timeDurationForQCL may take a value such as 7, 14 or 28 symbols.

The QCL time duration may be based on UE capability, or may be based on delay related to, for example, decoding of a PDCCH and beam switching. The QCL time duration may be a minimum time that is necessary for the UE to receive a PDCCH and apply spatial QCL information received in DCI for PDSCH processing. The QCL time duration may be expressed as the number of symbols per subcarrier spacing, or may be expressed as a time (e.g., μs). Information of the QCL time duration may be reported as UE capability information from the UE to the base station, or may be configured from the base station to the UE by using a higher layer signaling.

In addition, in the present disclosure, a threshold related to another DL signal may correspond to a beam switch timing when the another DL signal is an A-CSI-RS, and may correspond to a value of timeDurationForQCL reported by the UE when the another DL signal is a PDSCH.

In this regard, a case where a QCL assumption of the above-described another DL signal is applicable to the A-CSI RS may be limited to a case where an NZP CSI-RS resource set that specifies the A-CSI-RS resource does not include higher layer parameters "trs-Info" and "repetition".

In the NZP CSI-RS resource set with trs-Info configured to true, antenna ports of all NZP CSI-RS resources of the NZP CSI-RS resource set may be the same. The UE may not assume for an NZP CSI-RS resource set with Repetition configured to off that NZP CSI-RS resources in the NZP CSI-RS resource set are transmitted by the same downlink spatial domain transmission filter.

In addition, in a case where the scheduling offset of the A-CSI-RS is less than the beam switch timing reported by the UE, in a case where the value of the reported beam switch timing is one of 14, 28 and 48, and in a case where there is not the above-described another DL signal including the instructed TCI state in the same symbol as that of the A-CSI-RS, when receiving the A-CSI-RS, the UE applies the QCL assumption used for the CORESET associated with a monitored search space with the lowest CORESET-ID in the latest slot in which one or more CORESETs within the active BWP of the serving cell are monitored.

FIG. 1 is a diagram illustrating one example of a QCL assumption of an A-CSI-RS. FIG. 1 illustrates the example where DCI 1 schedules (triggers) the A-CSI-RS, and DCI 0 schedules another DL signal in the same symbol as that of the A-CSI-RS. The UE includes one of 14, 28 and 48 as a value of a beam switch timing in UE capability information to report to the network.

In FIG. 1, a scheduling offset 1 of the DCI 1 and the A-CSI-RS is less than the beam switch timing. On the other hand, a scheduling offset 0 of the DCI 0 and the another DL signal is a threshold (QCL time duration) or more. In this case, the UE may apply a QCL assumption of the another DL signal to reception of the A-CSI-RS.

Reception timings of the DCI 0 and the DCI 1 in FIG. 1 are not limited to these. Each embodiment of the present disclosure is applicable to a case, too, where reception timings of DCI for scheduling the A-CSI-RS and DCI for scheduling the another DL signal are the same.

In addition, in a case where a scheduling offset of a certain signal/channel is less than a certain threshold, a TC state or QCL (QCL assumption), which the UE assumes is applied to the certain signal/channel, may be referred to as default QCL. In the present disclosure, a default TCI state, default QCL and a default QCL assumption may be interchangeably read.

As described above, default QCL of the A-CSI-RS may be applied to a case where a scheduling offset of the A-CSI-RS is less than a threshold (reported beam switch timing). Furthermore, default QCL of a PDSCH may be applied to a case where a scheduling offset of the PDSCH is less than a threshold (QCL time duration).

Default QCL for, for example, a certain channel/signal (e.g., PDSCH) may be QCL that is assumed in a case where a TCI state/QCL indicated by DCI cannot be used, and may be QCL that is assumed in a case where a TCI state/QCL is not indicated (or configured).

(Multi TRPs)

It is studied for NR that one or a plurality of Transmission/Reception Points (TRPs) (multi TRPs (M-TRPs)) perform DL transmission for the UE by using one or a plurality of panels (multiple panels). Furthermore, it is studied that the UE performs UL transmission for one or a plurality of TRPs.

In addition, a plurality of TRPs may be associated with the same cell Identifier (ID), or may be associated with different cell IDs. The cell ID may be a physical cell ID or may be a virtual cell ID.

FIGS. 2A to 2D are diagrams illustrating one example of a multi TRP scenario. These examples assume that each TRP can transmit four different beams. However, the present disclosure is not limited to these examples.

FIG. 2A illustrates one example of a case (that may be referred to as, for example, a single mode or a single TRP) where only one TRP (a TRP 1 in this example) of the multi TRPs performs transmission for the UE. In this case, the TRP 1 transmits both of a control signal (PDCCH) and a data signal (PDSCH) to the UE.

FIG. 2B illustrates one example of a case (that may be referred to as a single master mode) where only one TRP (the TRP 1 in this example) of the multi TRPs transmits a control signal to the UE, and the multi TRPs transmit data signals. The UE receives each PDSCH transmitted from the multi TRPs based on one Downlink Control Information (DCI).

FIG. 2C illustrates one example of a case (that may be referred to as a master slave mode) where each of the multi TRPs transmits part of a control signal to the UE, and the multi TRPs transmit data signals. The TRP 1 may transmit a part 1 of the control signal (DCI), and a TRP 2 may transmit a part 2 of the control signal (DCI). The part 2 of the control signal may depend on the part 1. The UE receives each PDSCH transmitted from the multi TRPs based on parts of these pieces of DCI.

FIG. 2D illustrates one example of a case (that may be referred to as a multiple master mode) where each of the multi TRPs transmits different control signals to the UE, and the multi TRPs transmit data signals. The TRP 1 may transmit the first control signal (DCI), and the TRP 2 may transmit the second control signal (DCI). The UE receives each PDSCH transmitted from the multi TRPs based on these pieces of DCI.

When a plurality of PDSCHs (that may be referred to as multiple PDSCHs) from the multi TRPs illustrated in FIG. 2B are scheduled by using one DCI, the DCI may be referred to as single DCI (S-DCI or a single PDCCH). Furthermore, when a plurality of PDSCHs from the multi TRPs illustrated in FIG. 2D are respectively scheduled by using a plurality of pieces of DCI, a plurality of these pieces of DCI may be referred to as multiple pieces of DCI (M-DCI or multiple PDCCHs).

Each TRP of the multi TRPs may transmit a respectively different Code Word (CW) and different layer. Non-Coherent Joint Transmission (NCJT) is studied as one mode of multi TRP transmission.

According to NCJT, for example, the TRP 1 modulates, maps and performs layer mapping on a first code word, uses first precoding for a first number of layers (e.g., 2 layers), and thereby transmits a first PDSCH. Furthermore, the TRP 2 modulates, maps and performs layer mapping on a second code word, uses second precoding for a second number of layers (e.g., 2 layers), and thereby transmits a second PDSCH.

In addition, it may be defined that a plurality of PDSCHs (multiple PDSCHs) to be subjected to NCJT partially or fully overlap in at least one of time and frequency domains. That is, at least one of the time and frequency resources of the first PDSCH from the first TRP and the second PDSCH from the second TRP may overlap.

It may be assumed that these first PDSCH and second PDSCH do not have a Quasi-Co-Location (QCL) relation (are not quasi-co-located). Reception of the multiple PDSCHs may be read as simultaneous reception of PDSCHs that are not a certain QCL type (e.g., QCL type D).

It is studied for URLCC for multi TRPs to support repetition of PDSCHs (Transport Blocks (TBs) or Code Words (CWs)) over the multi TRPs. It is studied to support repetition schemes (URLLC schemes such as schemes 1, 2a, 2b, 3 and 4) over the multi TRPs in the frequency domain, a layer (spatial) domain or the time domain.

According to the scheme 1, multiple PDSCHs from multi TRPs are subjected to Space Division Multiplexing (SDM).

According to the schemes 2a and 2b, PDSCHs from multi TRPs are subjected to Frequency Division Multiplexing (FDM). According to the scheme 2a, Redundancy Versions (RVs) of the multi TRPs are the same. According to the scheme 2b, RVs of the multi TRPs may be the same or may be different.

According to the schemes 3 and 4, multiple PDSCHs from multi TRPs are subjected to Time Division Multiplexing (TDM). According to the scheme 3, the multiple PDSCHs from the multi TRPs are transmitted in one slot. According to the scheme 4, the multiple PDSCHs from the multi TRPs are transmitted in different slots.

According to this multi TRP scenario, it is possible to perform more flexible transmission control that uses channels of good quality.

NCJT that uses the multi TRPs/panels is likely to use a high rank. Both of single DCI (a single PDCCH in, for example, FIG. 2B) and multiple pieces of DCI (a single PDCCH in, for example, FIG. 2D) may be supported to support ideal and non-ideal backhauls between a plurality of TRPs. A maximum number of TRPs may be 2 for both of the single DCI and the multiple pieces of DCI.

A maximum number of CORESETs per PDCCH configuration information (PDCCH-Config) may be increased to 5 for a multiple PDCCH design according to UE capability. The maximum number of CORESETs to which the same TRP may be configured may be up to a number reported by the UE capability. The UE capability may include at least a candidate value "3".

The same TRP may be associated with the same higher layer index (e.g., a CORESET pool index or a TRP index) that is configured per PDCCH configuration information (per CORESET if configured). In other words, a TRP associated with a signal/channel may be identified based on the higher layer index.

(Default QCL Studied for Rel. 16 NR)

Now, according to Rel. 16 NR, default QCL in a case of cross-carrier scheduling is also argued. In a case where, for example, a PDSCH and a PDCCH for scheduling the PDSCH belong to different CCs, and in a case where a scheduling offset of these PDSCH and PDCCH is less than a QCL time duration or the PDCCH (DCI) does not include information of a TCI state, the UE may obtain a QCL assumption for a PDSCH to be scheduled from a TCI state of a lowest active TCI state ID that is applicable to the PDSCH in an active BWP of a cell to be scheduled.

Furthermore, according to Rel. 16 NR, in a case where a cross-carrier A-CSI-RS whose scheduling offset is less than a threshold is triggered, and the A-CSI-RS includes QCL-D information, and in a case where there is another DL signal in the same symbol as that of the A-CSI-RS of a cell to be scheduled, the UE may apply QCL-D of the another DL signal to (reception of) the A-CSI-RS. In this regard, a definition of the another DL signal may be the same as that of Rel. 15 NR.

In a case where there is not the another DL signal in the above case, and in a case where a CORESET is configured in a carrier (a CC or a cell) of the A-CSI-RS, when receiving the A-CSI-RS, the UE may apply a QCL assumption of a CORESET that has a lowest CORESET-ID in a latest slot in which one or more CORESETs in an active BWP of a serving cell are monitored, and that is associated with a search space to be monitored.

In a case where there is not the another DL signal in the above case, and in a case where a CORESET is not configured in a carrier (a CC or a cell) of the A-CSI-RS, when receiving the A-CSI-RS, the UE may apply QCL-D of a TCI state of a lowest active TCI ID that is applicable to a PDSCH in an active BWP of a serving cell of A-CSI-RS transmission.

Furthermore, according to Rel. 16 NR, it is studied for single DCI-based multi TRP/panel transmission that includes at least one TC state that includes QCL-D and is configured to a serving cell of a PDSCH to be scheduled that, in a case where a time offset between reception of a PDCCH and reception of a corresponding PDSCH is less than a threshold (timeDurationForQCL) after reception of a TCI state activation command for a UE-specific PDSCH, the UE may assume that a DMRS port of the PDSCH conforms to a QCL parameter instructed by TCI states (default TCI states) indicated below:

A TCI state associated with a lowest code point among TCI code points including two different TCI states that are activated for a PDSCH, and The same default TCI state as that of Rel. 15 (which is applied in a case where all TC code points are mapped in one TCI state).

Using the default TCI state for a plurality of PDSCHs based on the single DCI may be part of UE capability.

According to Rel. 16 NR, in a case where a CORESET pool index (e.g., RRC parameter "CORESETPoolIndex") is configured to multiple DCI-based multi TRP/panel transmission, and in a case where a time offset between reception of a PDCCH and reception of a corresponding PDSCH is less than a threshold, the UE may assume that an RS related to a QCL parameter used for the PDCCH of a lowest CORESET index among CORESETs to which a same value of a CORESET pool index is configured in each latest slot in which 1 or more CORESETs associated with respective CORESET pool indices in an active BWP of a serving cell are monitored by the UE is quasi-co-located with a DM-RS port of the PDSCH. Support of this function is displayed (reported) by UE capability. In a case where the UE does not support above feature, the operation of Rel. 15 may be reused irrespectively of the CORESET pool index.

However, past arguments on NR have not yet studied default QCL of the A-CSI-RS in a case of M-TRPs. Hence, there is a case where conforming to a current NR specification makes it impossible to appropriately determine a TCI state (QCL assumption) of the A-CSI-RS and measure CSI, and there is a risk that an increase in a communication throughput is suppressed.

Hence, the inventors of the present invention have conceived a method for appropriately determining a TCI state (QCL assumption) of an A-CSI-RS.

Embodiments according to the present disclosure will be descried in detail below with reference to the drawings. A radio communication method according to each embodiment may be each applied alone or may be applied in combination.

In addition, in the present disclosure, a panel, an Uplink (UL) transmission entity, a TRP, a spatial relation, a COntrol REsource SET (CORESET), a PDSCH, a Code Word (CW), a base station, a certain signal antenna port (e.g., DeModulation Reference Signal (DMRS) port), a certain signal antenna port group (e.g., DMRS port group), groups (e.g., a Code Division Multiplexing (CDM) group, a reference signal group and a CORESET group) for multiplexing, a CORESET pool, a Redundancy Version (RV), and layers (an MIMO layer, a transmission layer and a spatial layer) may be interchangeably read. In the present disclosure, a TRP identifier (ID) and a TRP may be interchangeably read.

In the present disclosure, NCJT, NCJT that uses multi TRPs, multiple PDSCHs that use NCJT, multiple PDSCHs and a plurality of PDSCHs from the multi TRPs may be interchangeably read.

In addition, in the present disclosure, a CORESET-ID may be an ID (an ID for identifying a CORESET) configured by an RRC information element "ControlResourceSet". Furthermore, in the present disclosure, a "lowest CORESET-ID" may be read as a specific CORESET-ID (e.g., a lowest CORESET-ID or a highest CORESET-ID).

Furthermore, in the present disclosure, the "latest slot" may mean a latest slot that is based on a timing to receive an A-CSI-RS to be scheduled, or may mean a latest slot that is based on a timing to receive DCI (PDCCH) for scheduling an A-CSI-RS.

In the present disclosure, the latest slot, the most recent slot, the latest search space, the most recent search space and the latest CORESET may be interchangeably read. Furthermore, the "latest slot" in the present disclosure may be read as contents from which the "latest slot" is deleted. For example, "a CORESET in the latest slot" may be read simply as a "CORESET", that is, may mean a CORESET in an arbitrary slot.

Furthermore, the present disclosures assumes a case where a value of a beam switch timing reported by the UE is one of 14, 28 and 48. However, this value may be read as another value (e.g., a specific value less than 100). Furthermore, the "beam switch timing" according to the present disclosure may be read as "a value based on the beam switch timing" (e.g., beam switch timing+specific value (e.g., a value obtained based on a subcarrier spacing of a CSI-RS).

In the present disclosure, that "S-DCI is configured" may be read as that "S-DCI-based M-TRP transmission is configured, instructed or used". In the present disclosure, that "M-DCI are configured" may be read as that "M-DCI-based M-TRP transmission is configured, instructed or used". In the present disclosure, that "M-TRPs are configured" may be read as that "M-TRP transmission is configured, instructed or used".

(Radio Communication Method)

First Embodiment

In the first embodiment, a UE may assume that at least one (one at minimum) CORESET is configured per TRP. In the first embodiment, there is no TRP to which a related CORESET is not configured. The UE may assume that a CORESET configured to at least one TRP is a CORESET that is not used to receive a PDCCH.

Default QCL of an A-CSI-RS in a case where M-TRPs are configured may be the same as that of Rel. 15 NR, or may be the same as that of Rel. 16 NR. In this case, for example, the UE triggers the A-CSI-RS via a CORESET associated with each TRP, so that it is possible to appropriately receive the A-CSI-RS associated with each TRP even when a scheduling offset is within a beam switch timing.

FIGS. 3A and 3B are diagrams illustrating one example of a CORESET configured in the first embodiment. FIG. 3A illustrates the example where M-DCI are configured, and FIG. 3B illustrates an example where S-DCI is configured. Furthermore, a following example (the same applies to FIGS. 4A and 4B, too) assumes that an A-CSI-RS #1 is associated with a TRP #1, and an A-CSI-RS #2 is associated with a TRP #2.

In FIG. 3A, a CORESET pool #1 of a pool index=0 associated with the TRP 1 and a CORESET pool #2 of a pool index=1 associated with the TRP 2 are configured to the UE. In a case of the first embodiment, the CORESET pools #1 and #2 each include at least one CORESET.

The UE configured with the M-DCI may be configured with a first number of (five in this example) CORESETs in total at maximum. In FIG. 3A, the pool #1 includes three CORESETs, and the pool #2 includes two CORESETs.

The UE configured with the S-DCI may be configured with a second number of (three in this example) CORESETs in total at maximum. In FIG. 3B, the UE is configured with two CORESETs associated with the TRP #1 and one CORESET associated with the TRP #2.

In this regard, the respective numbers of CORESETs are examples, and are not limited to these. Furthermore, the first number and the second number may be the above-described maximum numbers of CORESETs per PDCCH configuration information (PDCCH-Config), or may be numbers associated with UE capability.

Furthermore, even the UE configured with the S-DCI may be configured with a CORESET pool associated with a TRP. For example, the two CORESETs associated with the TRP #1 in FIG. 3B may be associated with the pool #1 and configured to the UE, and the one CORESET associated with the TRP #2 may be associated with the pool #2 and configured to the UE.

Even when there is not another DL signal to which the same QCL assumption can be applied in FIGS. 3A and 3B, the UE may assume that the A-CSI-RS #1 is quasi-co-located with a CORESET of a lowest CORESET ID of the CORESET of the CORESET pool #1 associated with the TRP 1 associated with the A-CSI-RS #1 (FIG. 3A) or the CORESET associated with the TRP #1 (FIG. 3B).

Even when there is not another DL signal to which the same QCL assumption can be applied in FIGS. 3A and 3B, the UE may assume that the A-CSI-RS #2 is quasi-co-located with a CORESET of a lowest CORESET ID of the CORESET of the CORESET pool #2 associated with the TRP 2 associated with the A-CSI-RS #2 (FIG. 3A) or the CORESET associated with the TRP #2 (FIG. 3B).

In addition, in the example in FIG. 3B, the UE may receive the S-DCI by using the CORESET of only one of the TRPs. When, for example, the S-DCI is received by using the CORESET associated with the TRP #1, the CORESET associated with the TRP #2 may not be used to receive the DCI. The S-DCI transmitted from the TRP #1 may schedule reception of the PDSCH of the TRP #2 and the A-CSI-RS #2. In this case, the CORESET of the TRP #2 may be used for a default QCL assumption of the A-CSI-RS #2.

According to the above-described first embodiment, the UE can grasp how the CORESET of each TRP in the case where the M-TRPs are configured is configured. Furthermore, it is possible to determine default QCL of an A-CSI-RS based on a CORESET, and suitably receive the A-CSI-RS according to the default QCL.

Second Embodiment

In the second embodiment, a UE may assume that even one CORESET is not configured to one TRP. For example, the UE may expect that a CORESET is not configured to a TRP that is not associated with at least one of a primary cell, a primary secondary cell, a PDCCH secondary cell and a special cell (in other words, a TRP that is associated only with a normal secondary cell).

Default QCL of an A-CSI-RS in a case where M-TRPs are configured may be the same as that of Rel. 15 NR, may be the same as that of Rel. 16 NR, or may be applied a third embodiment described later.

FIGS. 4A and 4B are diagrams illustrating an example of a CORESET configured in the second embodiment. FIG. 4A illustrates the example where M-DCI are configured, and FIG. 4B illustrates an example where S-DCI is configured.

In FIG. 4A, a CORESET pool #1 of a pool index=0 associated with the TRP 1 and a CORESET pool #2 of a pool index=1 associated with the TRP 2 are configured to the UE. In a case of the second embodiment, the CORESET pools #1 and #2 are each permitted to not include even one CORESET.

The UE configured with the M-DCI may be configured with a first number of (five in this example) CORESETs in total at maximum. In FIG. 4A, the pool #1 includes three CORESETs, and the pool #2 includes two CORESETs.

The UE configured with the S-DCI may be configured with a second number of (three in this example) CORESETs in total at maximum. In FIG. 4B, the UE is configured with three CORESETs associated with the TRP #1, yet is not configured with the CORESET associated with the TRP #2.

In this regard, the respective numbers of CORESETs are examples, and are not limited to these. Furthermore, the first number and the second number may be the above-described maximum numbers of CORESETs per PDCCH configuration information (PDCCH-Config), or may be numbers associated with UE capability.

Furthermore, even the UE configured with the S-DCI may be configured with a CORESET pool associated with a TRP. For example, the three CORESETs associated with the TRP #1 in FIG. 4B may be associated with the pool #1 and configured to the UE.

Even when there is not another DL signal to which the same QCL assumption can be applied in FIGS. 4A and 4B, the UE may assume that the A-CSI-RS #1 is quasi-co-located with a CORESET of a lowest CORESET ID of the CORESET of the CORESET pool #1 associated with the TRP 1 associated with the A-CSI-RS #1 (FIG. 4A) or the CORESET associated with the TRP #1 (FIG. 4B).

Furthermore, even when there is not another DL signal to which the same QCL assumption can be applied in FIG. 4A, the UE may assume that the A-CSI-RS #2 is quasi-co-located with a CORESET of a lowest CORESET ID among the CORESETs of the CORESET pool #2 associated with the TRP 2 associated with the A-CSI-RS #2.

Furthermore, in FIG. 4B, the UE cannot derive a default QCL assumption of the A-CSI-RS #2 based on the CORESET. As this default QCL assumption, default QCL described in the third embodiment may be applied.

In addition, in the example in FIG. 4B, the UE may receive the S-DCI by using the CORESET of only one of the TRPs. When, for example, the S-DCI is received by using the CORESET associated with the TRP #1, the CORESET associated with the TRP #2 may not be used to receive the DCI. The S-DCI transmitted from the TRP #1 may schedule reception of the PDSCH of the TRP #2 and the A-CSI-RS #2.

According to the above-described second embodiment, the UE can grasp how the CORESET of each TRP in the case where the M-TRPs are configured is configured. Furthermore, it is possible to determine default QCL of an A-CSI-RS based on a CORESET for a TRP to which a CORESET is configured, and suitably receive the A-CSI-RS according to the default QCL.

Third Embodiment

The third embodiment will describe a trigger and default QCL of an A-CSI-RS.

In this regard, the third embodiment may be applied only to a case where S-DCI is configured to a UE, or may be applied only to a case where a CORESET associated with at least one TRP is not configured in a certain BWP/CC/cell. The third embodiment may be applied to a case where M-DCI are configured to the UE.

[Trigger of A-CSI-RS]

The UE may trigger two A-CSI-RSs from each TRP based on one detected DCI.

The UE may assume that an A-CSI trigger state associated with a value indicated by a CSI request field included in the DCI instructs reception of the two A-CSI-RSs.

The UE may decide respective parameters of the two A-CSI-RSs from each TRP based on a field for specifying the parameters (e.g., resources) of the individual A-CSI-RSs included in the DCI. The field may be an explicit field related to the parameters of the A-CSI-RSs, or may be an implicit field that uses part or all of other fields.

For example, the DCI may be configured such that a field (e.g., time domain resource allocation field) related to a time/frequency/resource included in the DCI is expanded, and the UE can control resources of an A-CSI-RS #1 from a TRP #1 and an A-CSI-RS #2 from a TRP #2.

In addition, fields that are not expanded among fields that can be expanded for the A-CSI-RSs may be commonly applied to a plurality of A-CSI-RSs. For example, the UE that has received DCI whose field related to a time is not expanded among fields related to a time/frequency/resource may assume that time resources are the same between a plurality of A-CSI-RSs.

In addition, the case where A-CSI-RSs of two TRPs are simultaneously triggered by one DCI has been described above. However, the respective A-CSI-RSs may be triggered by using different pieces of DCI. For example, the UE may trigger the A-CSI-RS from a certain TRP based on DCI transmitted from the certain TRP (identical TRP A-CSI-RS trigger). Furthermore, the UE may trigger the A-CSI-RS from another TRP based on DCI transmitted from a certain TRP (cross TRP A-CSI-RS trigger). The DCI for the cross TRP A-CSI-RS trigger may include a field for specifying, for example, a resource of the another A-CSI-RS.

[Default QCL of A-CSI-RS]

When at least one scheduling offset of two A-CSI-RSs to be triggered is less than a beam switch timing, the UE that has detected one DCI for triggering the two A-CSI-RSs may apply default QCL to both of the two A-CSI-RSs.

In, for example, the case in FIG. 4B, when a scheduling offset of S-DCI and the A-CSI-RS #1 is less than a beam switch timing, the UE that has detected the S-DCI that triggers the A-CSI-RSs #1 and #2 and is transmitted from the TRP #1 may apply default QCL to each of the A-CSI-RSs #1 and #2, or may apply default QCL only to the A-CSI-RS #1.

When one scheduling offset of two A-CSI-RSs to be triggered is less than a beam switch timing, the UE that has detected one DCI for triggering the two A-CSI-RSs may apply default QCL to one of the two A-CSI-RSs, and may apply a TCI state instructed by the DCI to the other one of the two A-CSI-RSs.

When a scheduling offset of one A-CSI-RS to be triggered is less than a beam switch timing, the UE that has detected one DCI for triggering the one A-CSI-RS may apply default QCL to the A-CSI-RS.

Default QCL of an A-CSI-RS may be derived based on a TCI state of a PDSCH or default QCL of the PDSCH (in other words, the default QCL of an A-CSI-RS may be assumed to be the same as the TCI state of the PDSCH or the default QCL of the PDSCH).

For example, the default QCL of the A-CSI-RS may be TCI states (default TCI states) of a PDSCH indicated below:
  (1) One of a plurality of TCI states associated with a specific code point among TCI code points including a plurality of different TCI states that are activated for the PDSCH,
  (2) A TCI state associated with a specific code point among TCI code points that are activated for the PDSCH (one of a plurality states in a case where a TCI state associated with the code point includes a plurality of TCI states), and
  (3) The same default TCI state as that of Rel. 15.

In addition, "one of a plurality of TCI states" in (1) and (2) may correspond to a TCI state associated with a TRP associated with an A-CSI-RS. Furthermore, the "specific code point" in (1) and (2) may correspond to, for example, a code point of a lowest or highest index.

In addition, default QCL of an A-CSI-RS associated with one TRP may be determined according to a rule of Rel. 15. and default QCL of an A-CSI-RS associated with other TRP may be determined based on above-described (1) or (2).

For an A-CSI-RS of a TRP to which at least one associated CORESET is configured, the UE may decide default QCL based on a CORESET similar to Rel. 15.

According to the above-described third embodiment, the UE can appropriately decide, for example, default QCL of an A-CSI-RS associated with a TRP to which a CORESET is not configured, and can suitably receive the A-CSI-RS according to the default QCL.

Other Embodiment

The UE may use assumptions according to the above-described different embodiments depending on a type of DCI (M-DCI or S-DCI) to be configured. For example, the UE may apply an assumption of a CORESET according to the first embodiment when M-DCI are configured, and apply an assumption of a CORESET according to the second embodiment when S-DCI is configured.

In addition, a beam switch timing of an A-CSI-RS of a certain TRP and a beam switch timing of an A-CSI-RS of another TRP may take the same value, or may take different values.

(Radio Communication System)

The configuration of the radio communication system according to one embodiment of the present disclosure will be described below. This radio communication system uses one or a combination of the radio communication method according to each of the above embodiments of the present disclosure to perform communication.

Figure 5:
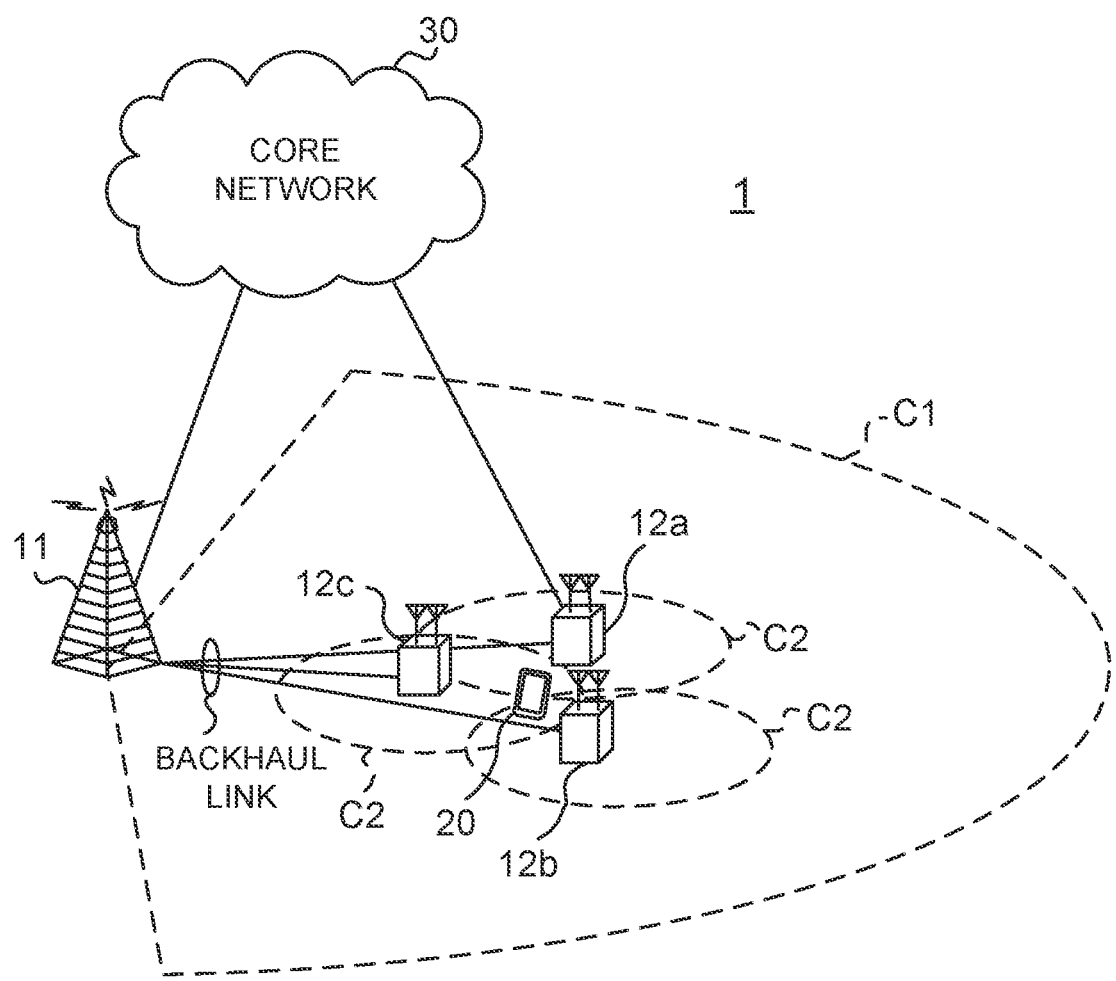
FIG. 5 is a diagram illustrating one example of a schematic configuration of a radio communication system according to one embodiment.

FIG. 5 is a diagram illustrating one example of a schematic configuration of the radio communication system according to the one embodiment. A radio communication system 1 may be a system that realizes communication by using Long Term Evolution (LTE) or the 5th generation mobile communication system New Radio (5G NR) specified by the Third Generation Partnership Project (3GPP).

Furthermore, the radio communication system 1 may support dual connectivity between a plurality of Radio Access Technologies (RATs) (Multi-RAT Dual Connectivity (MR-DC)). MR-DC may include dual connectivity (E-UTRA-NR Dual Connectivity (EN-DC)) of LTE (Evolved Universal Terrestrial Radio Access (E-UTRA)) and NR, and dual connectivity (NR-E-UTRA Dual Connectivity (NE-DC)) of NR and LTE.

According to EN-DC, a base station (eNB) of LTE (E-UTRA) is a Master Node (MN), and a base station (gNB) of NR is a Secondary Node (SN). According to NE-DC, a base station (gNB) of NR is an MN, and a base station (eNB) of LTE (E-UTRA) is an SN.

The radio communication system 1 may support dual connectivity between a plurality of base stations in an identical RAT (e.g., dual connectivity (NR-NR Dual Connectivity (NN-DC)) where both of the MN and the SN are base stations (gNBs) according to NR).

The radio communication system 1 may include a base station 11 that forms a macro cell C1 of a relatively wide coverage, and base stations 12 (12a to 12c) that are located in the macro cell C1 and form small cells C2 narrower than the macro cell C1. The user terminal 20 may be located in at least one cell. An arrangement and the numbers of respective cells and the user terminals 20 are not limited to the aspect illustrated in FIG. 5. The base stations 11 and 12 will be collectively referred to as a base station 10 below when not distinguished.

The user terminal 20 may connect with at least one of a plurality of base stations 10. The user terminal 20 may use at least one of Carrier Aggregation (CA) and Dual Connectivity (DC) that use a plurality of Component Carriers (CCs).

Each CC may be included in at least one of a first frequency range (Frequency Range 1 (FR 1)) and a second frequency range (Frequency Range 2 (FR 2)). The macro cell C1 may be included in the FR 1, and the small cell C2 may be included in the FR 2. For example, the FR 1 may be a frequency range equal to or less than 6 GHz (sub-6 GHz), and the FR 2 may be a frequency range higher than 24 GHz (above-24 GHz). In addition, the frequency ranges and definitions of the FR 1 and the FR 2 are not limited to these, and, for example, the FR 1 may correspond to a frequency range higher than the FR 2.

Furthermore, the user terminal 20 may perform communication by using at least one of Time Division Duplex (TDD) and Frequency Division Duplex (FDD) in each CC.

A plurality of base stations 10 may be connected by way of wired connection (e.g., optical fibers compliant with a Common Public Radio Interface (CPRI) or an X2 interface) or radio connection (e.g., NR communication). When, for example, NR communication is used as a backhaul between the base stations 11 and 12, the base station 11 corresponding to a higher station may be referred to as an Integrated Access Backhaul (IAB) donor, and the base station 12 corresponding to a relay station (relay) may be referred to as an IAB node.

The base station 10 may be connected with a core network 30 via the other base station 10 or directly. The core network 30 may include at least one of, for example, an Evolved Packet Core (EPC), a 5G Core Network (5GCN) and a Next Generation Core (NGC).

The user terminal 20 is a terminal that supports at least one of communication schemes such as LTE, LTE-A and 5G.

The radio communication system 1 may use an Orthogonal Frequency Division Multiplexing (OFDM)-based radio access scheme. For example, on at least one of Downlink (DL) and Uplink (UL), Cyclic Prefix OFDM (CP-OFDM), Discrete Fourier Transform Spread OFDM (DFT-s-OFDM), Orthogonal Frequency Division Multiple Access (OFDMA) and Single Carrier Frequency Division Multiple Access (SC-FDMA) may be used.

The radio access scheme may be referred to as a waveform. In addition, the radio communication system 1 may use another radio access scheme (e.g., another single carrier transmission scheme or another multicarrier transmission scheme) as the radio access scheme on UL and DL.

The radio communication system 1 may use a downlink shared channel (Physical Downlink Shared Channel (PDSCH)) shared by each user terminal 20, a broadcast channel (Physical Broadcast Channel (PBCH)) and a downlink control channel (Physical Downlink Control Channel (PDCCH)) as downlink channels.

Furthermore, the radio communication system 1 may use an uplink shared channel (Physical Uplink Shared Channel (PUSCH)) shared by each user terminal 20, an uplink control channel (Physical Uplink Control Channel (PUCCH)) and a random access channel (Physical Random Access Channel (PRACH)) as uplink channels.

User data, higher layer control information and a System Information Block (SIB) are conveyed on the PDSCH. The user data and the higher layer control information may be conveyed on the PUSCH. Furthermore, a Master Information Block (MIB) may be conveyed on the PBCH.

Lower layer control information may be conveyed on the PDCCH. The lower layer control information may include, for example, Downlink Control Information (DCI) including scheduling information of at least one of the PDSCH and the PUSCH.

In addition, DCI for scheduling the PDSCH may be referred to as, for example, a DL assignment or DL DCI, and DCI for scheduling the PUSCH may be referred to as, for example, a UL grant or UL DCI. In this regard, the PDSCH may be read as DL data, and the PUSCH may be read as UL data.

A COntrol REsource SET (CORESET) and a search space may be used to detect the PDCCH. The CORESET corresponds to a resource for searching DCI. The search space corresponds to a search domain and a search method of PDCCH candidates. One CORESET may be associated with one or a plurality of search spaces. The UE may monitor a CORESET associated with a certain search space based on a search space configuration.

One search space may be associated with a PDCCH candidate corresponding to one or a plurality of aggregation levels. One or a plurality of search spaces may be referred to as a search space set. In addition, a "search space", a "search space set", a "search space configuration", a "search space set configuration", a "CORESET" and a "CORESET configuration" in the present disclosure may be interchangeably read.

Uplink Control Information (UCI) including at least one of Channel State Information (CSI), transmission acknowledgement information (that may be referred to as, for example, Hybrid Automatic Repeat reQuest ACKnowledgement (HARQ-ACK) or ACK/NACK) and a Scheduling Request (SR) may be conveyed on the PUCCH. A random access preamble for establishing connection with a cell may be conveyed on the PRACH.

In addition, downlink and uplink in the present disclosure may be expressed without adding "link" thereto. Furthermore, various channels may be expressed without adding "physical" to heads of the various channels.

The radio communication system 1 may convey a Synchronization Signal (SS) and a Downlink Reference Signal (DL-RS). The radio communication system 1 may convey a Cell-specific Reference Signal (CRS), a Channel State Information Reference Signal (CSI-RS), a DeModulation Reference Signal (DMRS), a Positioning Reference Signal (PRS) and a Phase Tracking Reference Signal (PTRS) as DL-RSs.

The synchronization signal may be at least one of, for example, a Primary Synchronization Signal (PSS) and a Secondary Synchronization Signal (SSS). A signal block including the SS (the PSS or the SSS) and the PBCH (and the DMRS for the PBCH) may be referred to as, for example, an SS/PBCH block or an SS Block (SSB). In addition, the SS and the SSB may be also referred to as reference signals.

Furthermore, the radio communication system 1 may convey a Sounding Reference Signal (SRS) and a DeModulation Reference Signal (DMRS) as UpLink Reference Signals (UL-RSs). In this regard, the DMRS may be referred to as a user terminal-specific reference signal (UE-specific reference signal).

(Base Station)

Figure 6:
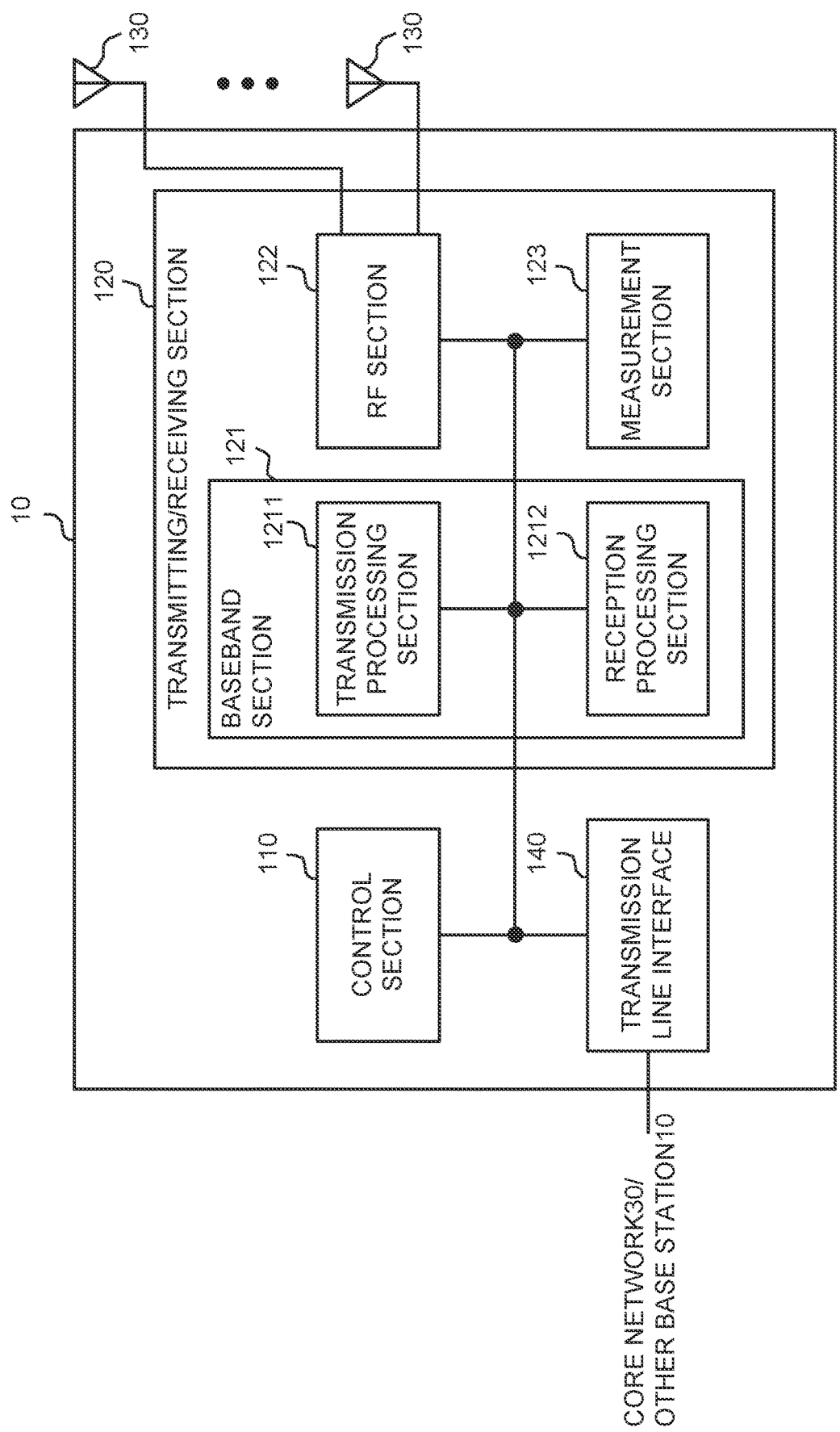
FIG. 6 is a diagram illustrating one example of a configuration of a base station according to the one embodiment.

FIG. 6 is a diagram illustrating one example of a configuration of the base station according to the one embodiment. The base station 10 includes a control section 110, a transmitting/receiving section 120, transmission/reception antennas 130 and a transmission line interface 140. In addition, the base station 10 may include one or more of each of the control sections 110, the transmitting/receiving sections 120, the transmission/reception antennas 130 and the transmission line interfaces 140.

In addition, this example mainly illustrates function blocks of characteristic portions according to the present embodiment, and may assume that the base station 10 includes other function blocks, too, that are necessary for radio communication. Part of processing of each section described below may be omitted.

The control section 110 controls the entire base station 10. The control section 110 can be composed of a controller or a control circuit described based on the common knowledge in the technical field according to the present disclosure.

The control section 110 may control signal generation and scheduling (e.g., resource allocation or mapping). The control section 110 may control transmission/reception and measurement that use the transmitting/receiving section 120, the transmission/reception antennas 130 and the transmission line interface 140. The control section 110 may generate data, control information or a sequence to be transmitted as a signal, and forward the signal to the transmitting/receiving section 120. The control section 110 may perform call processing (such as configuration and release) of a communication channel, state management of the base station 10 and radio resource management.

The transmitting/receiving section 120 may include a baseband section 121, a Radio Frequency (RF) section 122 and a measurement section 123. The baseband section 121 may include a transmission processing section 1211 and a reception processing section 1212. The transmitting/receiving section 120 can be composed of a transmitter/receiver, an RF circuit, a baseband circuit, a filter, a phase shifter, a measurement circuit and a transmission/reception circuit described based on the common knowledge in the technical field according to the present disclosure.

The transmitting/receiving section 120 may be composed as an integrated transmitting/receiving section, or may be composed of a transmitting section and a receiving section. The transmitting section may be composed of the transmission processing section 1211 and the RF section 122. The receiving section may be composed of the reception processing section 1212, the RF section 122 and the measurement section 123.

The transmission/reception antenna 130 can be composed of an antenna such as an array antenna described based on the common knowledge in the technical field according to the present disclosure.

The transmitting/receiving section 120 may transmit the above-described downlink channel, synchronization signal and downlink reference signal. The transmitting/receiving section 120 may receive the above-described uplink channel and uplink reference signal.

The transmitting/receiving section 120 may form at least one of a transmission beam and a reception beam by using digital beam forming (e.g., precoding) or analog beam forming (e.g., phase rotation).

The transmitting/receiving section 120 (transmission processing section 1211) may perform Packet Data Convergence Protocol (PDCP) layer processing, Radio Link Control (RLC) layer processing (e.g., RLC retransmission control), and Medium Access Control (MAC) layer processing (e.g., HARQ retransmission control) on, for example, the data and the control information obtained from the control section 110, and generate a bit sequence to transmit.

The transmitting/receiving section 120 (transmission processing section 1211) may perform transmission processing such as channel coding (that may include error correction coding), modulation, mapping, filter processing, Discrete Fourier Transform (DFT) processing (when needed), Inverse Fast Fourier Transform (IFFT) processing, precoding and digital-analog conversion on the bit sequence to transmit, and output a baseband signal.

The transmitting/receiving section 120 (RF section 122) may modulate the baseband signal into a radio frequency range, perform filter processing and amplification on the signal, and transmit the signal of the radio frequency range via the transmission/reception antennas 130.

On the other hand, the transmitting/receiving section 120 (RF section 122) may perform amplification and filter processing on the signal of the radio frequency range received by the transmission/reception antennas 130, and demodulate the signal into a baseband signal.

The transmitting/receiving section 120 (reception processing section 1212) may apply reception processing such as analog-digital conversion, Fast Fourier Transform (FFT) processing, Inverse Discrete Fourier Transform (IDFT) processing (when needed), filter processing, demapping, demodulation, decoding (that may include error correction decoding), MAC layer processing, RLC layer processing and PDCP layer processing to the obtained baseband signal, and obtain user data.

The transmitting/receiving section 120 (measurement section 123) may perform measurement related to the received signal. For example, the measurement section 123 may perform Radio Resource Management (RRM) measurement or Channel State Information (CSI) measurement based on the received signal. The measurement section 123 may measure received power (e.g., Reference Signal Received Power (RSRP)), received quality (e.g., Reference Signal Received Quality (RSRQ), a Signal to Interference plus Noise Ratio (SINR) or a Signal to Noise Ratio (SNR)), a signal strength (e.g., a Received Signal Strength Indicator (RSSI)) or channel information (e.g., CSI). The measurement section 123 may output a measurement result to the control section 110.

The transmission line interface 140 may transmit and receive (backhaul signaling) signals to and from apparatuses and the other base stations 10 included in the core network 30, and obtain and convey user data (user plane data) and control plane data for the user terminal 20.

In addition, the transmitting section and the receiving section of the base station 10 according to the present disclosure may be composed of at least one of the transmitting/receiving section 120, the transmission/reception antenna 130 and the transmission line interface 140.

In addition, the transmitting/receiving section 120 may transmit an A-CSI-RS and another DL signal to the user terminal 20.

(User Terminal)

Figure 7:
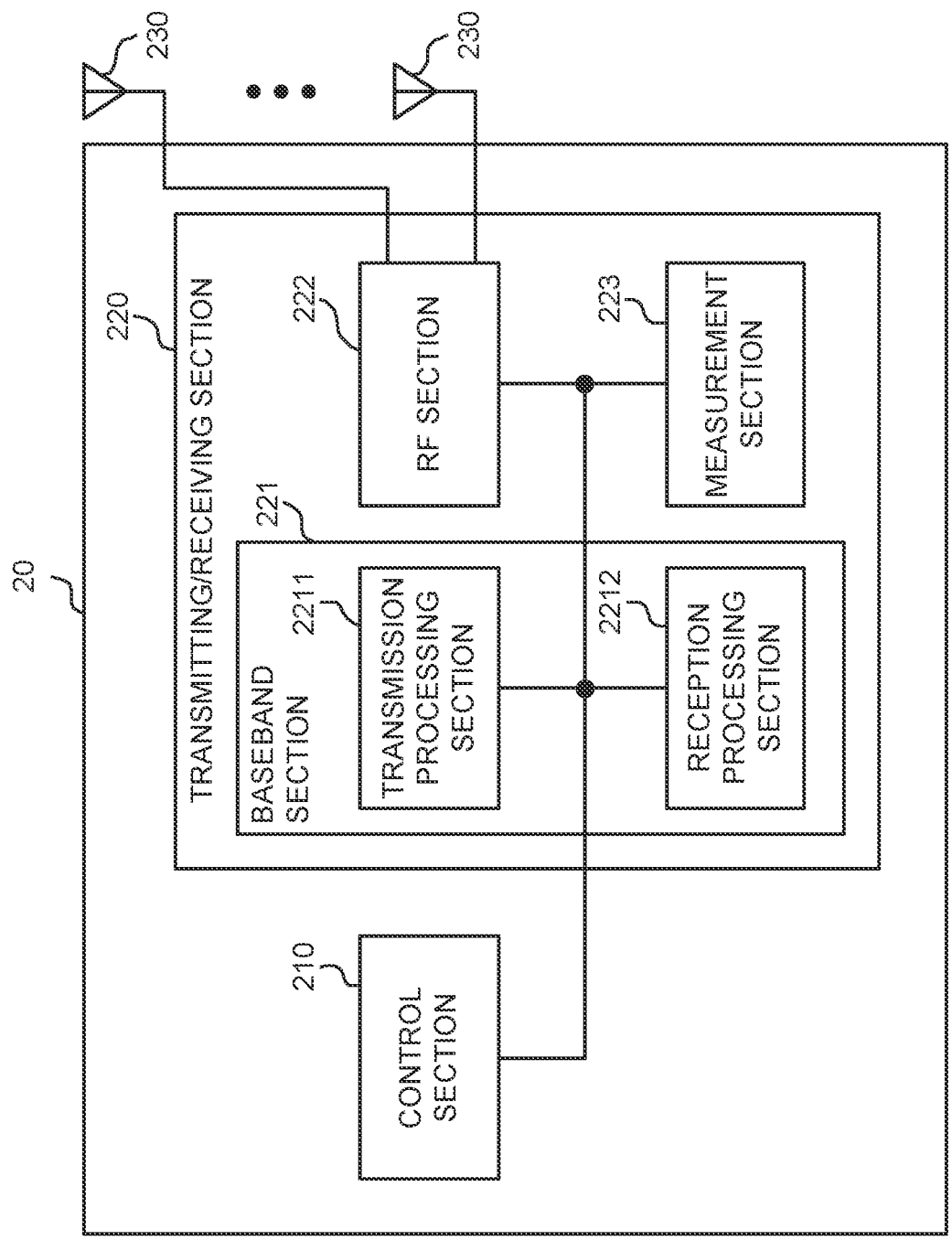
FIG. 7 is a diagram illustrating one example of a configuration of a user terminal according to the one embodiment.

FIG. 7 is a diagram illustrating one example of a configuration of the user terminal according to the one embodiment. The user terminal 20 includes a control section 210, a transmitting/receiving section 220 and transmission/reception antennas 230. In this regard, the user terminal 20 may include one or more of each of the control sections 210, the transmitting/receiving sections 220 and the transmission/reception antennas 230.

In addition, this example mainly illustrates function blocks of characteristic portions according to the present embodiment, and may assume that the user terminal 20 includes other function blocks, too, that are necessary for radio communication. Part of processing of each section described below may be omitted.

The control section 210 controls the entire user terminal 20. The control section 210 can be composed of a controller or a control circuit described based on the common knowledge in the technical field according to the present disclosure.

The control section 210 may control signal generation and mapping. The control section 210 may control transmission/reception and measurement that use the transmitting/receiving section 220 and the transmission/reception antennas 230. The control section 210 may generate data, control information or a sequence to be transmitted as a signal, and forward the signal to the transmitting/receiving section 220.

The transmitting/receiving section 220 may include a baseband section 221, an RF section 222 and a measurement section 223. The baseband section 221 may include a transmission processing section 2211 and a reception processing section 2212. The transmitting/receiving section 220 can be composed of a transmitter/receiver, an RF circuit, a baseband circuit, a filter, a phase shifter, a measurement circuit and a transmission/reception circuit described based on the common knowledge in the technical field according to the present disclosure.

The transmitting/receiving section 220 may be composed as an integrated transmitting/receiving section, or may be composed of a transmitting section and a receiving section. The transmitting section may be composed of the transmission processing section 2211 and the RF section 222. The receiving section may be composed of the reception processing section 2212, the RF section 222 and the measurement section 223.

The transmission/reception antenna 230 can be composed of an antenna such as an array antenna described based on the common knowledge in the technical field according to the present disclosure.

The transmitting/receiving section 220 may receive the above-described downlink channel, synchronization signal and downlink reference signal. The transmitting/receiving section 220 may transmit the above-described uplink channel and uplink reference signal.

The transmitting/receiving section 220 may form at least one of a transmission beam and a reception beam by using digital beam forming (e.g., precoding) or analog beam forming (e.g., phase rotation).

The transmitting/receiving section 220 (transmission processing section 2211) may perform PDCP layer processing, RLC layer processing (e.g., RLC retransmission control) and MAC layer processing (e.g., HARQ retransmission control) on, for example, the data and the control information obtained from the control section 210, and generate a bit sequence to transmit.

The transmitting/receiving section 220 (transmission processing section 2211) may perform transmission processing such as channel coding (that may include error correction coding), modulation, mapping, filter processing, DFT processing (when needed), IFFT processing, precoding and digital-analog conversion on the bit sequence to transmit, and output a baseband signal.

In this regard, whether or not to apply the DFT processing may be based on a configuration of transform precoding. When transform precoding is enabled for a certain channel (e.g., PUSCH), the transmitting/receiving section 220 (transmission processing section 2211) may perform the DFT processing as the above transmission processing to transmit the certain channel by using a DFT-s-OFDM waveform. When precoding is not enabled, the transmitting/receiving section 220 (transmission processing section 2211) may not perform the DFT processing as the above transmission processing.

The transmitting/receiving section 220 (RF section 222) may modulate the baseband signal into a radio frequency range, perform filter processing and amplification on the signal, and transmit the signal of the radio frequency range via the transmission/reception antennas 230.

On the other hand, the transmitting/receiving section 220 (RF section 222) may perform amplification and filter processing on the signal of the radio frequency range received by the transmission/reception antennas 230, and demodulate the signal into a baseband signal.

The transmitting/receiving section 220 (reception processing section 2212) may apply reception processing such as analog-digital conversion, FFT processing, IDFT processing (when needed), filter processing, demapping, demodulation, decoding (that may include error correction decoding), MAC layer processing, RLC layer processing and PDCP layer processing to the obtained baseband signal, and obtain user data.

The transmitting/receiving section 220 (measurement section 223) may perform measurement related to the received signal. For example, the measurement section 223 may perform, for example, RRM measurement or CSI measurement based on the received signal. The measurement section 223 may measure, for example, received power (e.g., RSRP), received quality (e.g., RSRQ, an SINR or an SNR), a signal strength (e.g., RSSI) or channel information (e.g., CSI). The measurement section 223 may output a measurement result to the control section 210.

In addition, the transmitting section and the receiving section of the user terminal 20 according to the present disclosure may be composed of at least one of the transmitting/receiving section 220 and the transmission/reception antenna 230.

In addition, in a case where conditions (1) and (2) are satisfied, the control section 210 may derive a Quasi-Co-Location (QCL) assumption of an Aperiodic Channel State Information-Reference Signal (A-CSI-RS) based on a specific Transmission Configuration Indication state (TCI state) for a Physical Downlink Shared Channel (PDSCH).

In this regard, (1) a scheduling offset between reception of a Physical Downlink Control Channel (PDCCH) for conveying Downlink Control Information (DCI) for scheduling the A-CSI-RS, and reception of the A-CSI-RS is less than a reported value of a duration for beam switch (that is, for example, a value of an RRC parameter "beamSwitchTiming" and is one of 14, 28 and 48), and (2) There is not another Downlink signal (DL signal) that includes an instructed Transmission Configuration Indication state (TCI state) or there is another downlink signal that does not include an instructed TCI state in the same symbol as that of the A-CSI-RS.

In this regard, the another downlink signal that does not include the instructed TCI state may be at least one of a Physical Downlink Shared Channel (PDSCH) that includes a scheduling offset less than a given threshold, and an A-CSI-RS that includes a scheduling offset less than the duration for beam switch.

The above QCL assumption in a case where both of the above conditions (1) and (2) are satisfied may be referred to as a default QCL assumption. Furthermore, the above specific TCI state may be a default TCI state of a PDSCH, and may be, for example, one of a plurality of TCI states associated with a specific code point among TCI code points including a plurality of different TCI states that are activated for the PDSCH. The specific code point may correspond to, for example, a lowest or highest code point.

The transmitting/receiving section 220 may receive the A-CSI-RS by using the QCL assumption that is based on the above CORESET.

The control section 210 may assume that at least one control resource set is configured to each transmission/reception point of a plurality of transmission/reception points.

The control section 210 may assume that even one control resource set is not configured to one transmission/reception point of a plurality of transmission/reception points.

The control section 210 may decide respective parameters (e.g., resources, mapping patterns, the numbers of ports, CSI-RS indices, scrambling sequences or scrambling IDs) of a plurality of A-CSI-RSs based on the downlink control information that includes information for triggering a plurality of these A-CSI-RSs and a field for specifying parameters of a plurality of these individual A-CSI-RSs.

In a case where Single Downlink Control Information (S-DCI) related to Multi Transmission/Reception Points (M-TRPs) and the both of conditions (1) and (2) are satisfied, the control section 210 derives the QCL assumption of the A-CSI-RS based on a specific TCI state for the PDSCH.

The beam switch timing according to the present disclosure may be expressed as a given threshold (e.g., a threshold different from timeDurationForQCL).

(Hardware Configuration)

In addition, the block diagrams used to describe the above embodiments illustrate blocks in function units. These function blocks (components) are realized by an arbitrary combination of at least ones of hardware components and software components. Furthermore, a method for realizing each function block is not limited in particular. That is, each function block may be realized by using one physically or logically coupled apparatus or may be realized by connecting two or more physically or logically separate apparatuses directly or indirectly (by using, for example, wired connection or radio connection) and using a plurality of these apparatuses. Each function block may be realized by combining software with the above one apparatus or a plurality of above apparatuses.

In this regard, the functions include deciding, determining, judging, calculating, computing, processing, deriving, investigating, looking up, ascertaining, receiving, transmitting, outputting, accessing, resolving, selecting, choosing, establishing, comparing, assuming, expecting, considering, broadcasting, notifying, communicating, forwarding, configuring, reconfiguring, allocating, mapping, and assigning, yet are not limited to these. For example, a function block (component) that causes transmission to function may be referred to as, for example, a transmitting unit or a transmitter. As described above, the method for realizing each function block is not limited in particular.

Figure 8:
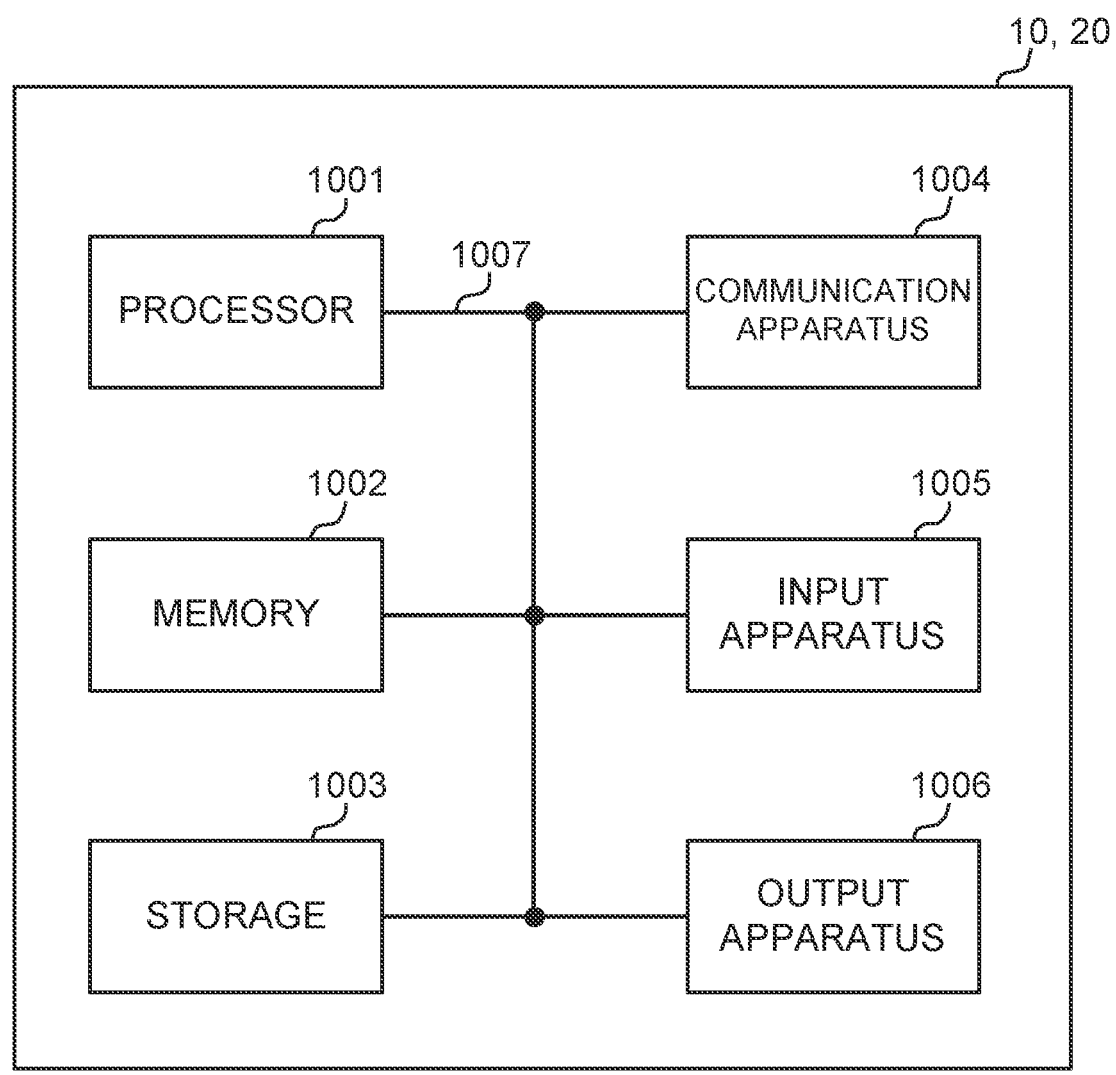
FIG. 8 is a diagram illustrating one example of hardware configurations of the base station and the user terminal according to the one embodiment.

For example, the base station and the user terminal according to the one embodiment of the present disclosure may function as computers that perform processing of the radio communication method according to the present disclosure. FIG. 8 is a diagram illustrating one example of the hardware configurations of the base station and the user terminal according to the one embodiment. The above-described base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, words such as an apparatus, a circuit, a device, a section and a unit in the present disclosure can be interchangeably read. The hardware configurations of the base station 10 and the user terminal 20 may be configured to include one or a plurality of apparatuses illustrated in FIG. 8 or may be configured without including part of the apparatuses.

For example, FIG. 8 illustrates the only one processor 1001. However, there may be a plurality of processors. Furthermore, processing may be executed by 1 processor or processing may be executed by 2 or more processors simultaneously or successively or by using another method. In addition, the processor 1001 may be implemented by 1 or more chips.

Each function of the base station 10 and the user terminal 20 is realized by, for example, causing hardware such as the processor 1001 and the memory 1002 to read given software (program), and thereby causing the processor 1001 to perform an operation, and control communication via the communication apparatus 1004 and control at least one of reading and writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, at least part of the above-described control section 110 (210) and transmitting/receiving section 120 (220) may be realized by the processor 1001.

Furthermore, the processor 1001 reads programs (program codes), software modules or data from at least one of the storage 1003 and the communication apparatus 1004 out to the memory 1002, and executes various types of processing according to these programs, software modules or data. As the programs, programs that cause the computer to execute at least part of the operations described in the above-described embodiments are used. For example, the control section 110 (210) may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as, for example, a register, a cache or a main memory (main storage apparatus). The memory 1002 can store programs (program codes) and software modules that can be executed to perform the radio communication method according to the one embodiment of the present disclosure.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via at least one of a wired network and a radio network, and is also referred to as, for example, a network device, a network controller, a network card and a communication module. The communication apparatus 1004 may be configured to include a high frequency switch, a duplexer, a filter and a frequency synthesizer to realize at least one of, for example, Frequency Division Duplex (FDD) and Time Division Duplex (TDD). For example, the above-described transmitting/receiving section 120 (220) and transmission/reception antennas 130 (230) may be realized by the communication apparatus 1004. The transmitting/receiving section 120 (220) may be physically or logically separately implemented as a transmitting section 120*a* (220*a*) and a receiving section 120*b* (220*b*).

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using different buses between apparatuses.

Furthermore, the base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or entirety of each function block. For example, the processor 1001 may be implemented by using at least one of these hardware components.

Modified Example

In addition, each term that has been described in the present disclosure and each term that is necessary to understand the present disclosure may be replaced with terms having identical or similar meanings. For example, a channel, a symbol and a signal (a signal or a signaling) may be interchangeably read. Furthermore, a signal may be a message. A reference signal can be also abbreviated as an RS, or may be referred to as a pilot or a pilot signal depending on standards to be applied. Furthermore, a Component Carrier (CC) may be referred to as, for example, a cell, a frequency carrier and a carrier frequency.

A radio frame may include one or a plurality of durations (frames) in a time domain. Each of one or a plurality of durations (frames) that makes up a radio frame may be referred to as a subframe. Furthermore, the subframe may include one or a plurality of slots in the time domain. The subframe may be a fixed time duration (e.g., 1 ms) that does not depend on a numerology.

In this regard, the numerology may be a communication parameter to be applied to at least one of transmission and reception of a certain signal or channel. The numerology may indicate at least one of, for example, a SubCarrier Spacing (SCS), a bandwidth, a symbol length, a cyclic prefix length, a Transmission Time period (TTI), the number of symbols per TTI, a radio frame configuration, specific filtering processing performed by a transceiver in a frequency domain, and specific windowing processing performed by the transceiver in a time domain.

The slot may include one or a plurality of symbols (Orthogonal Frequency Division Multiplexing (OFDM) symbols or Single Carrier Frequency Division Multiple Access (SC-FDMA) symbols) in the time domain. Furthermore, the slot may be a time unit based on the numerology.

The slot may include a plurality of mini slots. Each mini slot may include one or a plurality of symbols in the time domain. Furthermore, the mini slot may be referred to as a subslot. The mini slot may include a smaller number of symbols than that of the slot. The PDSCH (or the PUSCH) to be transmitted in larger time units than that of the mini slot may be referred to as a PDSCH (PUSCH) mapping type A. The PDSCH (or the PUSCH) to be transmitted by using the mini slot may be referred to as a PDSCH (PUSCH) mapping type B.

The radio frame, the subframe, the slot, the mini slot and the symbol each indicate a time unit for conveying signals. The other corresponding names may be used for the radio frame, the subframe, the slot, the mini slot and the symbol. In addition, time units such as a frame, a subframe, a slot, a mini slot and a symbol in the present disclosure may be interchangeably read.

For example, 1 subframe may be referred to as a TTI, a plurality of contiguous subframes may be referred to as TTIs, or 1 slot or 1 mini slot may be referred to as a TTI. That is, at least one of the subframe and the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as, for example, a slot or a mini slot instead of a subframe.

In this regard, the TTI refers to, for example, a minimum time unit of scheduling of radio communication. For example, in the LTE system, the base station performs scheduling for allocating radio resources (a frequency bandwidth or transmission power that can be used in each user terminal) in TTI units to each user terminal. In this regard, a definition of the TTI is not limited to this.

The TTI may be a transmission time unit of a channel-coded data packet (transport block), code block or code word, or may be a processing unit of scheduling or link adaptation. In addition, when the TTI is given, a time period (e.g., the number of symbols) in which a transport block, a code block or a code word is actually mapped may be shorter than the TTI.

In addition, in a case where 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that make up a minimum time unit of the scheduling may be controlled.

The TTI having the time duration of 1 ms may be referred to as, for example, a general TTI (TTIs according to 3GPP Rel. 8 to 12), a normal TTI, a long TTI, a general subframe, a normal subframe, a long subframe or a slot. A TTI shorter than the general TTI may be referred to as, for example, a reduced TTI, a short TTI, a partial or fractional TTI, a reduced subframe, a short subframe, a mini slot, a subslot or a slot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

A Resource Block (RB) is a resource allocation unit of the time domain and the frequency domain, and may include one or a plurality of contiguous subcarriers in the frequency domain. The numbers of subcarriers included in RBs may be the same irrespectively of a numerology, and may be, for example, 12. The numbers of subcarriers included in the RBs may be determined based on the numerology.

Furthermore, the RB may include one or a plurality of symbols in the time domain or may have the length of 1 slot, 1 mini slot, 1 subframe or 1 TTI. 1 TTI or 1 subframe may each include one or a plurality of resource blocks.

In this regard, one or a plurality of RBs may be referred to as, for example, a Physical Resource Block (Physical RB (PRB)), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

A Bandwidth Part (BWP) (that may be referred to as, for example, a partial bandwidth) may mean a subset of contiguous common Resource Blocks (common RBs) for a certain numerology in a certain carrier. In this regard, the common RB may be specified by an RB index based on a common reference point of the certain carrier. A PRB may be defined based on a certain BWP, and may be numbered in the certain BWP.

The BWP may include a UL BWP (a BWP for UL) and a DL BWP (a BWP for DL). One or a plurality of BWPs in 1 carrier may be configured to the UE.

At least one of the configured BWPs may be active, and the UE may not assume to transmit and receive given signals/channels outside the active BWP. In addition, a "cell" and a "carrier" in the present disclosure may be read as a "BWP".

In this regard, structures of the above-described radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and the parameters described in the present disclosure may be expressed by using absolute values, may be expressed by using relative values with respect to given values or may be expressed by using other corresponding information. For example, a radio resource may be instructed by a given index.

Names used for parameters in the present disclosure are in no respect restrictive names. Furthermore, numerical expressions that use these parameters may be different from those explicitly disclosed in the present disclosure. Various channels (such as the PUCCH and the PDCCH) and information elements can be identified based on various suitable names. Therefore, various names assigned to these various channels and information elements are in no respect restrictive names.

The information and the signals described in the present disclosure may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or arbitrary combinations of these.

Furthermore, the information and the signals can be output at least one of from a higher layer to a lower layer and from the lower layer to the higher layer. The information and the signals may be input and output via a plurality of network nodes.

The input and output information and signals may be stored in a specific location (e.g., memory) or may be managed by using a management table. The information and signals to be input and output can be overridden, updated or additionally written. The output information and signals may be deleted. The input information and signals may be transmitted to other apparatuses.

Notification of information is not limited to the aspect/embodiments described in the present disclosure and may be performed by using other methods. For example, the information may be notified in the present disclosure by a physical layer signaling (e.g., Downlink Control Information (DCI) and Uplink Control Information (UCI)), a higher layer signaling (e.g., a Radio Resource Control (RRC) signaling, broadcast information (such as a Master Information Block (MIB) and a System Information Block (SIB)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") is not limited to explicit notification, and may be given implicitly (by, for example, not giving notification of the given information or by giving notification of another information).

Judgement may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or is referred to as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using at least ones of wired techniques (e.g., coaxial cables, optical fiber cables, twisted pairs and Digital Subscriber Lines (DSLs)) and radio techniques (e.g., infrared rays and microwaves), at least ones of these wired techniques and radio techniques are included in a definition of the transmission media.

The terms "system" and "network" used in the present disclosure can be interchangeably used. The "network" may mean an apparatus (e.g., base station) included in the network.

In the present disclosure, terms such as "precoding", a "precoder", a "weight (precoding weight)", "Quasi-Co-Location (QCL)", a "Transmission Configuration Indication state (TCI state)", a "spatial relation", a "spatial domain filter", "transmission power", "phase rotation", an "antenna port", an "antenna port group", a "layer", "the number of layers", a "rank", a "resource", a "resource set", a "resource group", a "beam", a "beam width", a "beam angle", an "antenna", an "antenna element" and a "panel" can be interchangeably used.

In the present disclosure, terms such as a "Base Station (BS)", a "radio base station", a "fixed station", a "NodeB", an "eNodeB (eNB)", a "gNodeB (gNB)", an "access point", a "Transmission Point (TP)", a "Reception Point (RP)", a "Transmission/Reception Point (TRP)", a "panel", a "cell", a "sector", a "cell group", a "carrier" and a "component carrier" can be interchangeably used. The base station is also referred to as terms such as a macro cell, a small cell, a femtocell or a picocell.

The base station can accommodate one or a plurality of (e.g., three) cells. When the base station accommodates a plurality of cells, an entire coverage area of the base station can be partitioned into a plurality of smaller areas. Each smaller area can also provide a communication service via a base station subsystem (e.g., indoor small base station (Remote Radio Head (RRH))). The term "cell" or "sector" indicates part or the entirety of the coverage area of at least one of the base station and the base station subsystem that provide a communication service in this coverage.

In the present disclosure, the terms such as "Mobile Station (MS)", "user terminal", "user apparatus (User Equipment (UE))" and "terminal" can be interchangeably used.

The mobile station is also referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

At least one of the base station and the mobile station may be referred to as, for example, a transmission apparatus, a reception apparatus or a radio communication apparatus. In addition, at least one of the base station and the mobile station may be, for example, a device mounted on a movable body or the movable body itself. The movable body may be a vehicle (e.g., a car or an airplane), may be a movable body (e.g., a drone or a self-driving car) that moves unmanned or may be a robot (a manned type or an unmanned type). In addition, at least one of the base station and the mobile station includes an apparatus, too, that does not necessarily move during a communication operation. For example, at least one of the base station and the mobile station may be an Internet of Things (IoT) device such as a sensor.

Furthermore, the base station in the present disclosure may be read as the user terminal. For example, each aspect/embodiment of the present disclosure may be applied to a configuration where communication between the base station and the user terminal is replaced with communication between a plurality of user terminals (that may be referred to as, for example, Device-to-Device (D2D) or Vehicle-to-Everything (V2X)). In this case, the user terminal 20 may be configured to include the functions of the above-described base station 10. Furthermore, words such as "uplink" and "downlink" may be read as a word (e.g., a "side") that matches terminal-to-terminal communication. For example, the uplink channel and the downlink channel may be read as side channels.

Similarly, the user terminal in the present disclosure may be read as the base station. In this case, the base station 10 may be configured to include the functions of the above-described user terminal 20.

In the present disclosure, operations performed by the base station are performed by an upper node of this base station depending on cases. Obviously, in a network including one or a plurality of network nodes including the base stations, various operations performed to communicate with a terminal can be performed by base stations, one or more network nodes (that are regarded as, for example, Mobility Management Entities (MMEs) or Serving-Gateways (S-GWs), yet are not limited to these) other than the base stations or a combination of these.

Each aspect/embodiment described in the present disclosure may be used alone, may be used in combination or may be switched and used when carried out. Furthermore, orders of the processing procedures, the sequences and the flowchart according to each aspect/embodiment described in the present disclosure may be rearranged unless contradictions arise. For example, the method described in the present disclosure presents various step elements by using an exemplary order and is not limited to the presented specific order.

Each aspect/embodiment described in the present disclosure may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New-Radio Access Technology (RAT), New Radio (NR), New radio access (NX), Future generation radio access (FX), the Global System for Mobile communications (GSM (registered trademark)), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods, or next-generation systems that are enhanced based on these systems. Furthermore, a plurality of systems may be combined (for example, LTE or LTE-A and 5G may be combined) and applied.

The phrase "based on" used in the present disclosure does not mean "based only on" unless specified otherwise. In other words, the phrase "based on" means both of "based only on" and "based at least on".

Every reference to elements that use names such as "first" and "second" used in the present disclosure does not generally limit the quantity or the order of these elements. These names can be used in the present disclosure as a convenient method for distinguishing between two or more elements. Hence, the reference to the first and second elements does not mean that only two elements can be employed or the first element should precede the second element in some way.

The term "deciding (determining)" used in the present disclosure includes diverse operations in some cases. For example, "deciding (determining)" may be considered to "decide (determine)" judging, calculating, computing, processing, deriving, investigating, looking up, search and inquiry (e.g., looking up in a table, a database or another data structure), and ascertaining.

Furthermore, "deciding (determining)" may be considered to "decide (determine)" receiving (e.g., receiving information), transmitting (e.g., transmitting information), input, output and accessing (e.g., accessing data in a memory).

Furthermore, "deciding (determining)" may be considered to "decide (determine)" resolving, selecting, choosing, establishing and comparing. That is, "deciding (determining)" may be considered to "decide (determine)" some operation.

Furthermore, "deciding (determining)" may be read as "assuming", "expecting" and "considering".

The words "connected" and "coupled" used in the present disclosure or every modification of these words can mean every direct or indirect connection or coupling between 2 or more elements, and can include that 1 or more intermediate elements exist between the two elements "connected" or "coupled" with each other. The elements may be coupled or connected physically or logically or by a combination of these physical and logical connections. For example, "connection" may be read as "access".

It can be understood in the present disclosure that, when connected, the two elements are "connected" or "coupled" with each other by using 1 or more electric wires, cables or printed electrical connection, and by using electromagnetic energy having wavelengths in radio frequency domains, microwave domains or (both of visible and invisible) light domains in some non-restrictive and non-comprehensive examples.

A sentence that "A and B are different" in the present disclosure may mean that "A and B are different from each other". In this regard, the sentence may mean that "A and B are each different from C". Words such as "separate" and "coupled" may be also interpreted in a similar way to "different".

In a case where the words "include" and "including" and modifications of these words are used in the present disclosure, these words intend to be comprehensive similar to the word "comprising". Furthermore, the word "or" used in the present disclosure intends to not be an exclusive OR.

In a case where, for example, translation adds articles such as a, an and the in English in the present disclosure, the present disclosure may include that nouns coming after these articles are plural.

The invention according to the present disclosure has been described in detail above. However, it is obvious for a person skilled in the art that the invention according to the present disclosure is not limited to the embodiments described in the present disclosure. The invention according to the present disclosure can be carried out as modified and changed aspects without departing from the gist and the scope of the invention defined based on the recitation of the claims. Accordingly, the description of the present disclosure is intended for exemplary explanation, and does not bring any restrictive meaning to the invention according to the present disclosure.

The invention claimed is:

1. A terminal comprising:
   a processor that derives a Quasi-Co-Location (QCL) assumption of a first Aperiodic Channel State Information-Reference Signal (A-CSI-RS) based on a Transmission Configuration Indication state (TCI state) corresponding to a specific code point among TCI code points including multiple different TCI states in a case where both of following conditions (1) and (2) are satisfied, where:
   (1) a scheduling offset between a last symbol of a downlink control channel that conveys downlink control information triggering the first A-CSI-RS, and a first symbol of the first A-CSI-RS is less than a reported value of a duration for beam switch, and
   (2) there is not another downlink signal with an indicated TCI state or there is another downlink signal that does not include an indicated TCI state, in a same symbol as a symbol of the first A-CSI-RS; and
   a receiver that receives the first A-CSI-RS based on the QCL assumption,
   wherein the specific code point is a lowest TCI code point.

2. The terminal according to claim 1, wherein, when multiple downlink control information related to a plurality of Control Resource Set (CORESET) pool indices is configured, and when there is not another downlink signal with the indicated TCI state or there is another downlink signal that does not include the indicated TCI state, in a same symbol as a symbol of a second A-CSI-RS, the processor applies a QCL parameter of a CORESET with a lowest CORESET ID, among CORESETs corresponding respectively to the plurality of CORESET pool indices, to the second A-CSI-RS corresponding to each of the plurality of CORESET pool indices.

3. The terminal according to claim 1, wherein single downlink control information related to multi transmission/reception points is configured.

4. A radio communication method for a terminal, comprising:
   deriving a Quasi-Co-Location (QCL) assumption of a first Aperiodic Channel State Information-Reference Signal (A-CSI-RS) based on a Transmission Configuration Indication state (TO state) corresponding to a specific code point among TCI code points including multiple different TCI states in a case where both of following conditions (1) and (2) are satisfied, where:
   (1) a scheduling offset between a last symbol of a downlink control channel that conveys downlink control information triggering the first A-CSI-RS, and a first symbol of the first A-CSI-RS is less than a reported value of a duration for beam switch, and
   (2) there is not another downlink signal with an indicated TCI state or there is another downlink signal that does not include an indicated TCI state, in a same symbol as a symbol of the first A-CSI-RS; and
   receiving the first A-CSI-RS based on the QCL assumption,
   wherein the specific code point is a lowest TCI code point.

5. A system comprising a terminal and a base station, wherein
   the terminal comprises:
      a processor that derives a Quasi-Co-Location (QCL) assumption of a first Aperiodic Channel State Information-Reference Signal (A-CSI-RS) based on a Transmission Configuration Indication state (TCI state) corresponding to a specific code point among TCI code points including multiple different TCI states in a case where both of following conditions (1) and (2) are satisfied, where:
      (1) a scheduling offset between a last symbol of a downlink control channel that conveys downlink control information triggering the first A-CSI-RS, and a first symbol of the first A-CSI-RS is less than a reported value of a duration for beam switch, and
      (2) there is not another downlink signal with an indicated TCI state or there is another downlink signal that does not include an indicated TCI state, in a same symbol as a symbol of the first A-CSI-RS; and
      a receiver that receives the first A-CSI-RS based on the QCL assumption,
      wherein the specific code point is a lowest TCI code point, and
   the base station comprising:
      a transmitter that transmits the first A-CSI-RS.

* * * * *